(12) United States Patent
Park

(10) Patent No.: US 11,177,698 B2
(45) Date of Patent: Nov. 16, 2021

(54) WIRELESS POWER TRANSMITTER AND CONTROL METHOD THEREFOR

(71) Applicant: SAMSUNG ELECTRONICS CO., LTD., Suwon-si (KR)

(72) Inventor: Jae-Seok Park, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/334,138

(22) PCT Filed: May 24, 2017

(86) PCT No.: PCT/KR2017/005412
§ 371 (c)(1),
(2) Date: Mar. 18, 2019

(87) PCT Pub. No.: WO2018/052177
PCT Pub. Date: Mar. 22, 2018

(65) Prior Publication Data
US 2019/0372399 A1 Dec. 5, 2019

(30) Foreign Application Priority Data
Sep. 19, 2016 (KR) .......................... 10-2016-0119247

(51) Int. Cl.
*H01F 27/42* (2006.01)
*H01F 37/00* (2006.01)
(Continued)

(52) U.S. Cl.
CPC .............. *H02J 50/23* (2016.02); *H01Q 3/04* (2013.01); *H01Q 3/30* (2013.01); *H02J 7/025* (2013.01);
(Continued)

(58) Field of Classification Search
CPC . H02J 5/005; H02J 7/025; H02J 17/00; H01F 38/14; B60L 11/182
(Continued)

(56) References Cited

U.S. PATENT DOCUMENTS 6,967,462 B1* 11/2005 Landis .................... H02J 50/40
320/101
2010/0033021 A1* 2/2010 Bennett .................. H02J 50/12
307/104

(Continued)

FOREIGN PATENT DOCUMENTS

KR 10-2011-0065537 6/2011
KR 10-2012-0009929 2/2012
(Continued)

OTHER PUBLICATIONS

International Search Report for PCT/KR2017/005412 and English-language translation, dated Aug. 25, 2017, 7 pages.
(Continued)

*Primary Examiner* — Quan Tra
(74) *Attorney, Agent, or Firm* — Nixon & Vanderhye, P.C.

(57) ABSTRACT

A wireless power transmitter according to various embodiments comprises: a power transmission antenna array capable of transmitting power in a wireless manner; a driving circuit for mechanically adjusting the steering direction of the power transmission antenna array; and a processor, wherein the processor can be configured so as to determine the direction in which an electronic device is positioned, control the driving circuit such that the driving circuit mechanically adjusts the steering direction of the power transmission antenna array when the direction in which the electronic device is positioned is not included in a coverage corresponding to the steering direction of the power transmission antenna array, and control the power
(Continued)

transmission antenna array such that the power transmission antenna array transmits the power to the electronic device.

20 Claims, 18 Drawing Sheets

(51) Int. Cl.
    *H01F 38/00*     (2006.01)
    *H02J 50/23*     (2016.01)
    *H02J 50/80*     (2016.01)
    *H02J 50/90*     (2016.01)
    *H02J 50/40*     (2016.01)
    *H02J 50/60*     (2016.01)
    *H01Q 3/04*     (2006.01)
    *H01Q 3/30*     (2006.01)
    *H02J 7/02*     (2016.01)

(52) U.S. Cl.
    CPC .............. *H02J 50/40* (2016.02); *H02J 50/60* (2016.02); *H02J 50/80* (2016.02); *H02J 50/90* (2016.02)

(58) Field of Classification Search
    USPC ........................................................ 307/104
    See application file for complete search history.

(56) References Cited

U.S. PATENT DOCUMENTS

| | | | |
|---|---|---|---|
| 2010/0078995 A1 | 4/2010 | Hyde et al. | |
| 2010/0079005 A1* | 4/2010 | Hyde | H02J 50/10 307/104 |
| 2010/0315045 A1* | 12/2010 | Zeine | H02J 7/0021 320/137 |
| 2012/0193999 A1 | 8/2012 | Zeine | |
| 2012/0235499 A1* | 9/2012 | Liu | H02J 7/025 307/104 |
| 2014/0354064 A1* | 12/2014 | Tseliakhovich | H01Q 3/32 307/104 |
| 2015/0022009 A1 | 1/2015 | Leabman et al. | |
| 2015/0171658 A1 | 6/2015 | Manova-Elissibony et al. | |
| 2015/0195015 A1 | 7/2015 | Kim et al. | |
| 2015/0340875 A1 | 11/2015 | Prasad | |
| 2016/0241061 A1 | 8/2016 | Werner et al. | |

FOREIGN PATENT DOCUMENTS

| | | |
|---|---|---|
| KR | 10-2014-0123222 | 10/2014 |
| WO | 2014/014315 | 1/2014 |

OTHER PUBLICATIONS

Written Opinion of the ISA for PCT/KR2017/005412, dated Aug. 25, 2017, 6 pages.
Extended Search Report dated Apr. 10, 2019 in counterpart European Patent Application No. 17851054.1.

* cited by examiner

WIRELESS POWER TRANSMITTER AND CONTROL METHOD THEREFOR

This application is the U.S. National Phase Entry of PCT International Application No. PCT/KR2017/005412, which was filed on May 24, 2017 and claims priority under 35 U.S.C. § 119 of Korean Patent Application No. 10-2016-0119247, filed on Sep. 19, 2016, in the Korean Intellectual Property Office the entire contents of each of which are hereby incorporated herein by reference.

BACKGROUND

1. Field

The disclosure relates to a wireless power transmitter and a method of controlling the same and, more particularly, to a wireless power transmitter capable of wireless transmitting power to an electronic device and a method of controlling the same.

2. Description of Related Art

Portable digital communication devices have become essential to many people in modern times. Customers desire to receive various high-quality services anywhere and around the clock. In addition, recently various sensors, home appliances, communication devices or the like existing in our lives have been connected over a network through Internet of Things (IoT). A wireless power transmission system is required to smoothly operate the various sensors.

Wireless power transmission includes magnetic induction type, magnetic resonance type, and electromagnetic type. The electromagnetic type is more advantageous in long-distance power transmission compared to the other types.

The electromagnetic type is mainly used for long-distance power transmission, and detection of the accurate location of a power receiver and efficient transmission of power are primary concerns

SUMMARY

A wireless power transmitter according to an electromagnetic scheme may perform beamforming of RF waves in a power transmission antenna array having a plurality of patch antennas and transmit power to an electronic device. In this case, the electronic device may be charged with relatively high efficiency in an area within, for example, ±30 degrees with respect to a central line passing through the center of the power transmission antenna array. However, in an area beyond 30 degrees with respect to the central line of the power transmission antenna array, a gain of the RF wave is relatively low and thus the electronic device is charged with relatively low efficiency. That is, if the electronic device to be charged leaves a particular area based on the power transmission antenna array, the magnitude of power received through the RF wave becomes relatively low.

Various embodiments may provide a wireless power transmitter capable of mechanically adjusting a steering direction of the power transmission antenna array if the electronic device is located within a range in which charging is performed with relatively low efficiency, and a method of controlling the same.

In accordance with an aspect of the disclosure, a wireless power transmitter is provided. The wireless power transmitter includes: a power transmission antenna array configured to wirelessly transmit power; a driving circuit configured to mechanically adjust a steering direction of the power transmission antenna array; and a processor, wherein the processor determines a direction in which an electronic device is located, controls the driving circuit to mechanically adjust the steering direction of the power transmission antenna array when the direction in which the electronic device is located is not included in coverage corresponding to the steering direction of the power transmission antenna array, and controls the power transmission antenna array to transmit the power to the electronic device.

In accordance with another aspect of the disclosure, a method of controlling a wireless power transmitter is provided. The method includes: determining a direction in which an electronic device is located; mechanically adjusting a steering direction of a power transmission antenna array when the direction in which the electronic device is located is not included in coverage corresponding to the steering direction of the power transmission antenna array; and controlling the power transmission antenna array to transmit power to the electronic device.

Various embodiments may provide a wireless power transmitter capable of mechanically adjusting a steering direction of an antenna array when an electronic device is located within a range in which charging is performed with relatively low efficiency, and a method of controlling the same. Accordingly, the wireless power transmitter can change the electronic device with relatively high efficiency.

DETAILED DESCRIPTION OF THE DISCLOSURE

Figure 1:
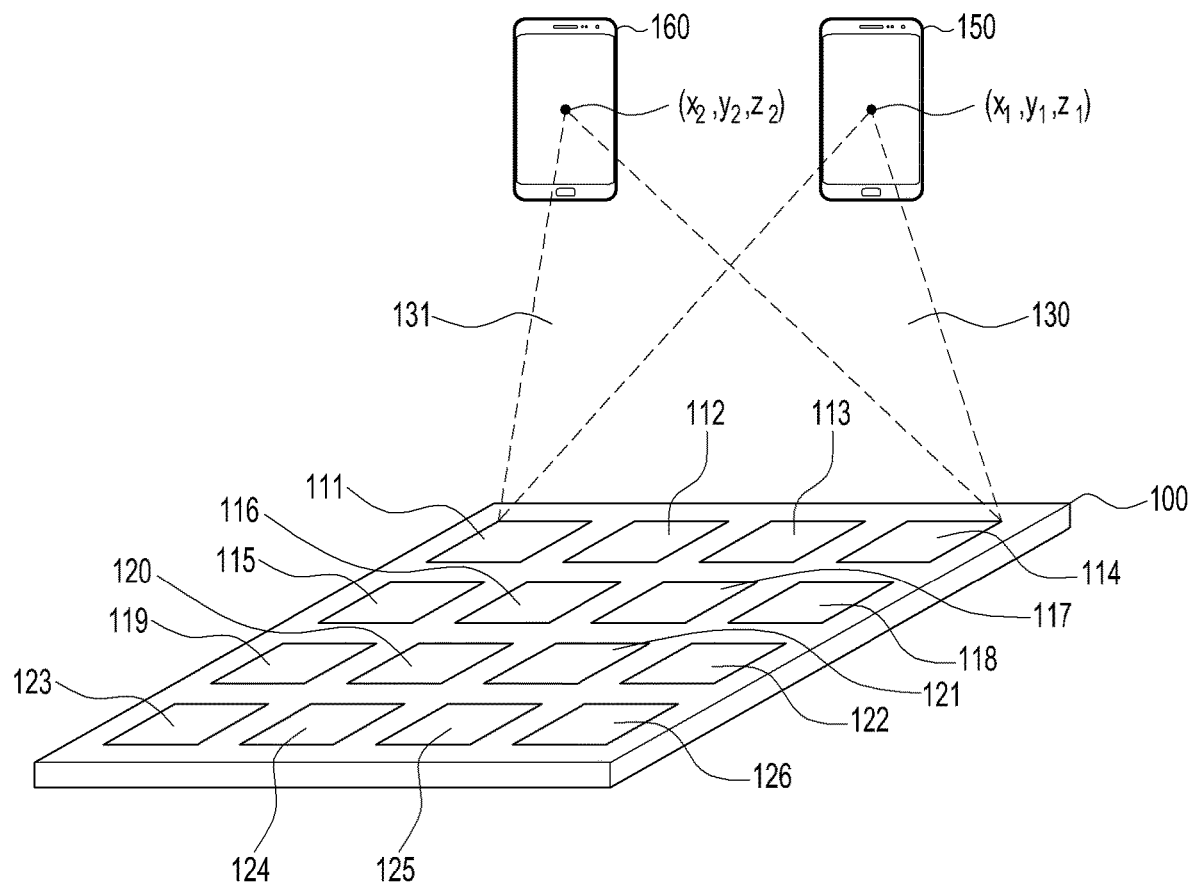
FIG. 1 is a conceptual diagram illustrating a wireless power transmission system according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box, a game console, an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). According to various embodiments, a wireless power transmitter or an electronic device may be flexible, or may be a combination of two or more of the above described various devices. The wireless power transmitter or the electronic device according to one embodiment of the disclosure is not limited to the above described devices. In the disclosure, the term "user" may indicate a person who uses an electronic device or a device (e.g., an artificial intelligence electronic device) that uses a wireless power transmitter or an electronic device.

FIG. 1 is a conceptual diagram illustrating a wireless power transmission system according to various embodiments of the disclosure.

A wireless power transmitter 100 may wirelessly transmit power to at least one electronic device 150 and 160. According to various embodiments of the disclosure, the wireless power transmitter 100 may include a plurality of patch antennas 111 to 126. Any antenna that is capable of generating an RF wave can be used as the patch antenna 111 to 126. At least one of the amplitude and the phase of an RF wave generated by the patch antennas 111 to 126 may be adjusted by the wireless power transmitter 100. For ease of description, an RF wave generated by each of the patch antennas 111 to 126 may be referred to as a sub RF wave.

According to various embodiments of the disclosure, the wireless power transmitter 100 may adjust at least one of the amplitude and the phase of each of the sub RF waves generated by the patch antennas 111 to 126. Meanwhile, the sub RF waves may mutually interfere with each other. For example, the sub RF waves may mutually create constructive interference at one point, and may mutually create destructive interference at another point. The wireless power transmitter 100 according to various embodiments of the disclosure may adjust at least one of the amplitude and the phase of each of the sub RF waves generated by the patch antennas 111 to 126 such that the sub RF waves mutually create constructive interference at a first point (x1,y1,z1).

For example, the wireless power transmitter 100 may determine that an electronic device 150 is disposed at the first point (x1,y1,z1). The location of the electronic device 150 may be, for example, the location of a power reception antenna of the electronic device 150. The architecture in which the wireless power transmitter 100 determines the location of the electronic device 150 will be described in detail later. In order to enable the electronic device 150 to wirelessly receive power with high transmission efficiency, sub RF waves need to create constructive interference at the first point (x1,y1,z1). Accordingly, the wireless power transmitter 100 may control the patch antennas 111 to 126 such that the sub RF waves mutually create constructive interference at the first point (x1,y1,z1). Controlling the patch antennas 111 to 126 may mean controlling the size of signals input to the patch antennas 111 to 126 or controlling the phase (or the delay) of signals input to the patch antennas 111 to 126. Meanwhile, those skilled in the art may readily understand beamforming which is a technology for controlling RF waves to create constructive interference at a particular point. Additionally, those skilled in the art may readily understand that the type of beamforming used in the disclosure is not limited. Various beamforming methods may be used, such as methods disclosed in U.S. patent Publication No. 2016/0099611, U.S. patent Publication No. 2016/0099755, U.S. patent Publication No. 2016/0100124, and the like. The form of RF waves formed by beamforming may be referred to as pockets of energy.

Accordingly, an RF wave 130 including sub RF waves may have the maximum amplitude at the first point (x1,y1, z1), and accordingly, the electronic device 150 may receive wireless power with high efficiency. Meanwhile, the wireless power transmitter 100 may detect a disposition of the electronic device 160 at a second point (x2,y2,z2). The wireless power transmitter 100 may control the patch antennas 111 to 126 such that sub-RF waves create constructive interference at the second point (x2,y2,z2) in order to charge the electronic device 160. Accordingly, an RF wave 131 including sub RF waves may have the maximum amplitude at the second point (x2,y2,z2), and accordingly, the electronic device 160 may receive wireless power with high transmission efficiency.

More particularly, the electronic device 150 may be disposed relatively on the right side. In this case, the wireless power transmitter 100 may apply a relatively larger delay to sub RF waves formed by the patch antennas (for example, the patch antennas 114, 118, 122, and 126) disposed relatively on the right side. That is, sub RF waves may be first formed by the patch antennas (for example, the patch antennas 111, 115, 119, and 123) disposed relatively on the left side, and after a predetermined period of time, sub RF waves may be generated by the patch antennas (for example, the patch antennas 114, 118, 122, and 126) disposed relatively on the right side. Accordingly, the sub RF waves may simultaneously meet at a point relatively on the right side. That is, the sub RF waves may create constructive interference at the point relatively on the right side. When beamforming is performed at a relatively center point, the wireless power transmitter 100 may apply substantially the same delay to the left side patch antennas (for example, the patch antennas 111, 115, 119, and 123) and the right side patch antennas (for example, patch antennas 114, 118, 122, and 126). Also, when beamforming is performed at a point relatively on the left side, the wireless power transmitter 100 may apply a higher delay to the left side patch antennas (for example, the patch antennas 111, 115, 119, and 123) than to the right side patch antennas (for example, the patch antennas 114, 118, 122, and 126). Meanwhile, according to another embodiment, the wireless power transmitter 100 may oscillate the sub-RF waves by all the patch antennas 111 to 126 at substantially the same time, and may perform beamforming by adjusting a phase corresponding to the above described delay.

As described above, the wireless power transmitter 100 may determine the location of the electronic devices 150 and 160 and perform wireless charging with high transmission efficiency to make the sub RF waves create constructive interference at the determined location. Meanwhile, the wireless power transmitter 100 may perform wireless charting with high transmission efficiency only through detection of the accurate location of the electronic devices 150 and 160.

Figure 2A:
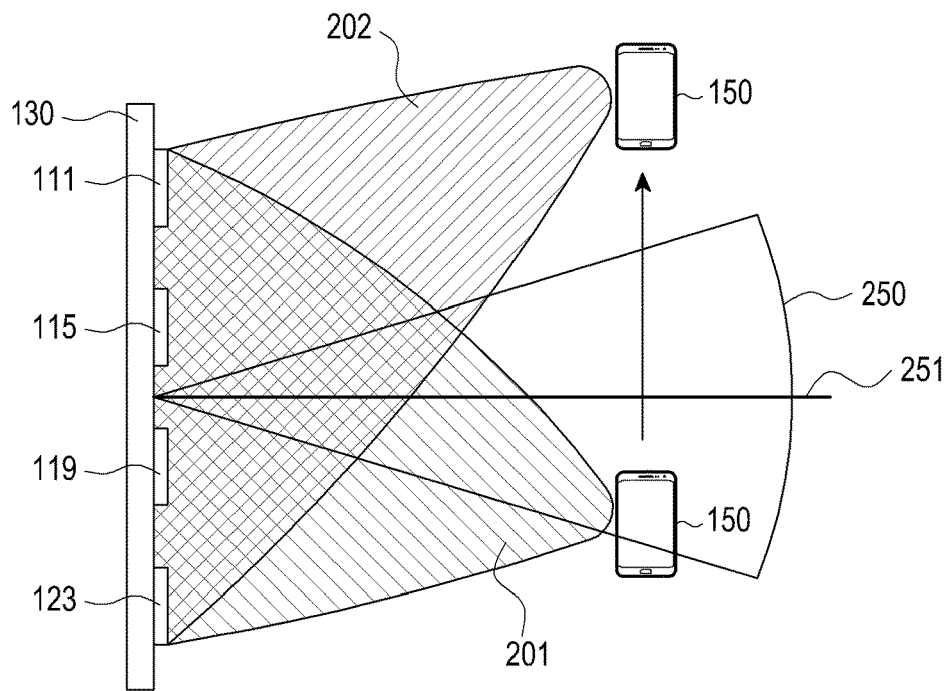
FIGS. 2A and 2B are conceptual diagrams illustrating adjustment of a steering direction of a wireless power transmitter according to various embodiments of the disclosure.
Figure 2B:
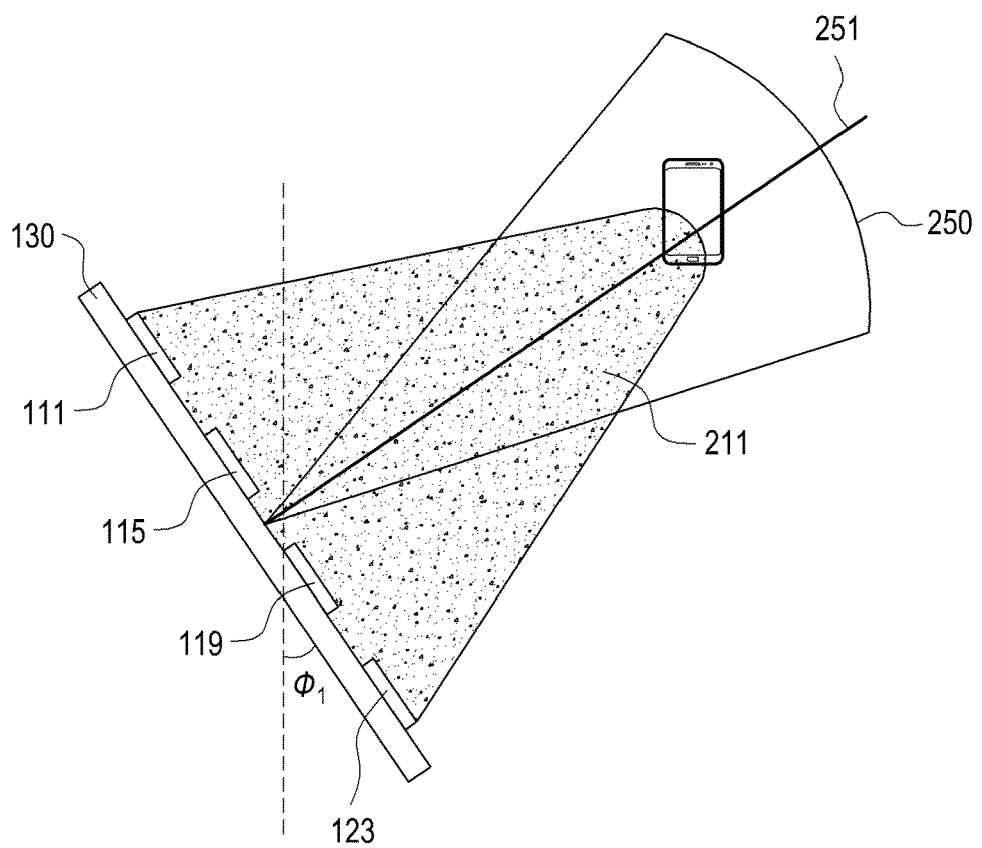

FIGS. 2A and 2B are conceptual diagrams illustrating adjustment of a steering direction of a wireless power transmitter according to various embodiments of the disclosure.

FIG. 2A is a conceptual diagram illustrating a power transmission antenna array 130 of the wireless power transmitter viewed from the side in which some 111, 115, 119, and 123 of the patch antennas of the power transmission antenna array 130 may be shown. At a first time point, the electronic device 150 may be included in a first coverage 250 based on the center of the patch antennas 111 to 126. The first coverage 250 may be configured on the basis of, for example, the center of the power transmission antenna array 130 in which the patch antennas 111 to 126 are disposed. The first coverage 250 may be, for example, a range in which a first angle (θ) is larger than or equal to −30 degrees and equal to or smaller than 30 degrees of spherical coordinates with respect to a central line 251 passing through the center and a second angle (φ) is larger than or equal to −30 degrees and equal to or smaller than 30 degrees. Accordingly, when viewed from one side as illustrated in FIG. 2A, the first coverage 250 may be configured as a fan shape. In three dimensions, the first coverage 250 may be configured as, for example, a cone. Meanwhile, the first angle (θ) and the second angle (φ) for configuring the first coverage 250 may be ranges other than the range larger than or equal to −30 degrees and equal to or smaller than 30 degrees. An RF wave having a large angle, for example, the large second angle (φ) with respect to the central line 251 passing through the center of the power transmission antenna array 130 in which the patch antennas 111 to 126 are disposed may have a relatively small gain. Accordingly, an angle range in a direction of the first angle (θ) and an angle range in a direction of the second angle (φ) for configuring the first coverage 250 may be configured as an angle range having a gain of the formed RF wave which is larger than or equal to a preset threshold. That is, when the direction in which the electronic device 150 is located is included in the coverage 250, the electronic device 150 may receive power larger than or equal to preset magnitude.

The wireless power transmitter 100 may determine the direction in which the electronic device 150 is located or the location of the electronic device 150. According to various embodiments of the disclosure, the wireless power transmitter 100 may determine the direction of the electronic device 150 using the time at which a communication signal from the electronic device 150 is received by a plurality of communication antennas of the wireless power transmitter 100. For example, the wireless power transmitter 100 may determine that the electronic device 150 is located in a direction of −10 degrees with respect to the center of the power transmission antenna array 130. For convenience of description, the description has been made only for the direction of the second angle (φ), but the wireless power transmitter 100 may determine the direction of the electronic device 150 for the direction of the first angle (θ) as well as the second angle (φ). The wireless power transmitter 100 may form an RF wave 201 in the direction in which the electronic device 150 is located. For example, the wireless power transmitter 100 may form the RF wave 201 in the direction of −10 degrees in the direction of the second angle of −10 degrees.

The wireless power transmitter 100 may form the RF wave 201 such that sub RF waves create constructive interference at a point included in the first coverage 250 as illustrated in FIG. 2A. That is, the wireless power transmitter 100 may form the RF wave 201 inside the first coverage 250. Accordingly, the wireless power transmitter 100 may charge the electronic device 150 with relatively high efficiency. Meanwhile, the location of the electronic device 150 may leave the first coverage 250.

The wireless power transmitter 100 may detect a change in the direction in which the electronic device 150 is located. For example, the wireless power transmitter 100 may detect the change in the direction in which the electronic device 150 is located into 70 degrees. The wireless power transmitter 100 may form an RF wave 202 in accordance with the change in the direction in which the electronic device 150 is located. As described above, when the point at which the RF wave 202 is formed leaves the first coverage 250, charging efficiency may be relatively low. A gain of the RF wave 202 may be relatively low, which means the magnitude of power received by the electronic device 150 through the RF wave 202 becomes relatively smaller.

As illustrated in FIG. 2A, the wireless power transmitter 100 may mechanically adjust the steering direction of the power transmission antenna array 130 by φ1 in the direction of the second angle (φ). The steering direction of the power transmission antenna array 130 may refer to a direction of a straight line orthogonal to the power transmission antenna array 130 such as a central line 251 of the power transmission antenna array 130. In the embodiment of FIG. 2A, the wireless power transmitter 100 changes the direction in which the RF wave is formed by changing at least one of the amplitude and the phase of the electrical signal input into each patch antenna, which may be named an electrical steering direction change of the wireless power transmitter 100. Meanwhile, the wireless power transmitter 100 may further include a driving circuit capable of rotating the power transmission antenna array 130. The wireless power transmitter 100 may physically change the steering direction of the power transmission antenna array 130 through the driving circuit, which may be named a mechanical steering direction change. That is, the wireless power transmitter 100 according to various embodiments of the disclosure may perform both the mechanical steering direction change and the electrical steering direction change.

For example, the wireless power transmitter 100 may determine that an amount (φ1) of the mechanical change in the steering direction of the power transmission antenna array is 70 degrees. According to various embodiments of the disclosure, after mechanically changing the steering direction of the power transmission antenna array 130, the wireless power transmitter 100 may determine the amount (φ1) of the mechanical change in the steering direction of the power transmission antenna array such that the central line 251 of the power transmission antenna array 130 matches a target direction. As described above, for example, the wireless power transmitter 100 may determine that the direction of the electronic device 150 is 70 degrees and that the current steering direction of the power transmission antenna array 130 is 0 degrees. Accordingly, it may be determined that the amount (φ1) of the mechanically change in the steering direction of the power transmission antenna array 130 is 70 degrees. The wireless power transmitter 100 may form an RF wave 211 through the power transmission antenna array 130 of which the steering direction has been mechanically changed. The wireless power transmitter 100 may form the RF wave in the direction of the central line 251 of the power transmission antenna array 130. According to the above description, the wireless power transmitter 100 may form the RF wave at a point included in the first coverage 250 and may charge the electronic device 150 with relatively high efficiency.

Meanwhile, according to another embodiment of the disclosure, the wireless power transmitter 100 may be configured to minimally and mechanically change the steering direction of the power transmission antenna array 130. For example, the wireless power transmitter 100 may determine that the amount (φ1) of the mechanical change in the steering direction of the power transmission antenna array is 40 degrees. In this case, the electronic device 150 may be included in the first coverage 250 with respect to central line 251 of the power transmission antenna array 130 of which the steering direction has been changed, so that the wireless power transmitter 100 may charge the electronic device 150 with relatively high efficiency.

According to various embodiments of the disclosure, the wireless power transmitter 100 may mechanically change the steering direction of the power transmission antenna array 130 such that the target, that is, the electronic device 150 is included in the preset first coverage 250. There is no limit on the amount of the mechanical change in the steering direction of the power transmission antenna array 130 if the target is included in the preset first coverage 250.

A time spent on the mechanical change in the steering direction may be longer than a time spent on the electrical change in the steering direction. Accordingly, the wireless power transmitter 100 may determine the amount of the mechanical change in the steering direction in consideration of the spent time and wireless charging efficiency. Further, as described above, when it is determined that the electronic device 150 which is the target to be charged is not included in the first coverage 250, the wireless power transmitter 100 may mechanically change the steering direction of the power transmission antenna array 130.

Figure 3A:
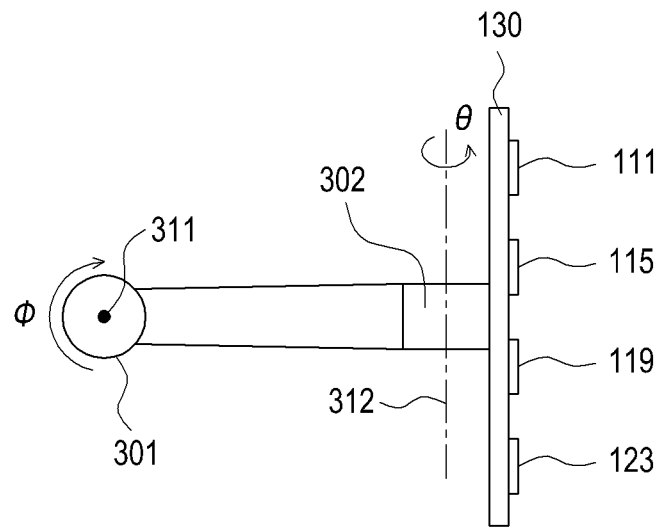
FIGS. 3A to 3C are conceptual diagrams illustrating a change in a steering direction of a power transmission antenna array according to various embodiments of the disclosure.
Figure 3B:
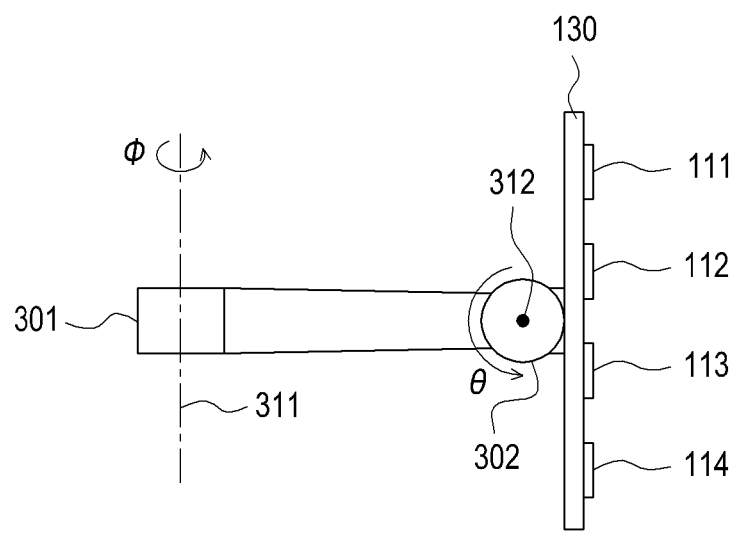
Figure 3C:
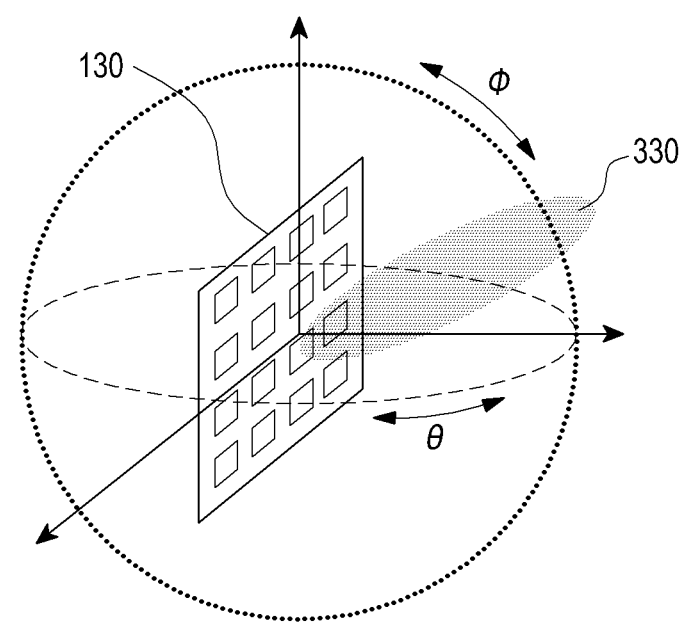

FIGS. 3A to 3C are conceptual diagrams illustrating a change in a steering direction of a power transmission antenna array according to various embodiments of the disclosure.

FIG. 3A is a side view of a wireless power transmitter and FIG. 3B is a plan view of a wireless power transmitter viewed from the top. Referring to FIG. 3A, on the side view, some (111,115,119,123) of the patch antennas arranged in the power transmission antenna array 130 may be shown. Referring to FIG. 3B, on the plan view, some (111,112,113, 114) of the patch antennas arranged in the power transmission antenna array 130 may be shown. The power transmission antenna array 130 may be connected to a second motor 302. The second motor 302 may rotate in a direction of a first angle (θ) with respect to the center of a second rotation shape 312. As the rotation of the second motor 302, the power transmission antenna array 130 may also rotate in the direction of the first angle (θ).

Meanwhile, the second motor 302 may be connected to a first motor 301. The first motor 301 may rotate in the direction of the second angle (φ) with respect to the center of a first rotation shaft 311. According to the rotation of the first motor 301, the power transmission antenna array 130 may rotate in the direction of the second angle (φ). The first rotation shaft 311 and the second rotation shaft 312 may be actually orthogonal to each other. The wireless power transmitter 100 or a processor (not shown) of the wireless power transmitter 100 may control at least one of the first motor 301 and the second motor 302 to change a steering direction of the power transmission antenna array 130 in accordance with the direction of the electronic device. Accordingly, as illustrated in FIG. 3C, the power transmission antenna array 130 may form an RF wave 330 while freely changing the steering angle in the direction of the first angle (θ) and the direction of the second angle (φ).

Meanwhile, the wireless power transmitter 100 mechanically changing the steering direction of the power transmission antenna array 130 through the two motors as described above is only an example, and the wireless power transmitter 100 may include various three-dimensional rotation driving circuits.

Figure 4:
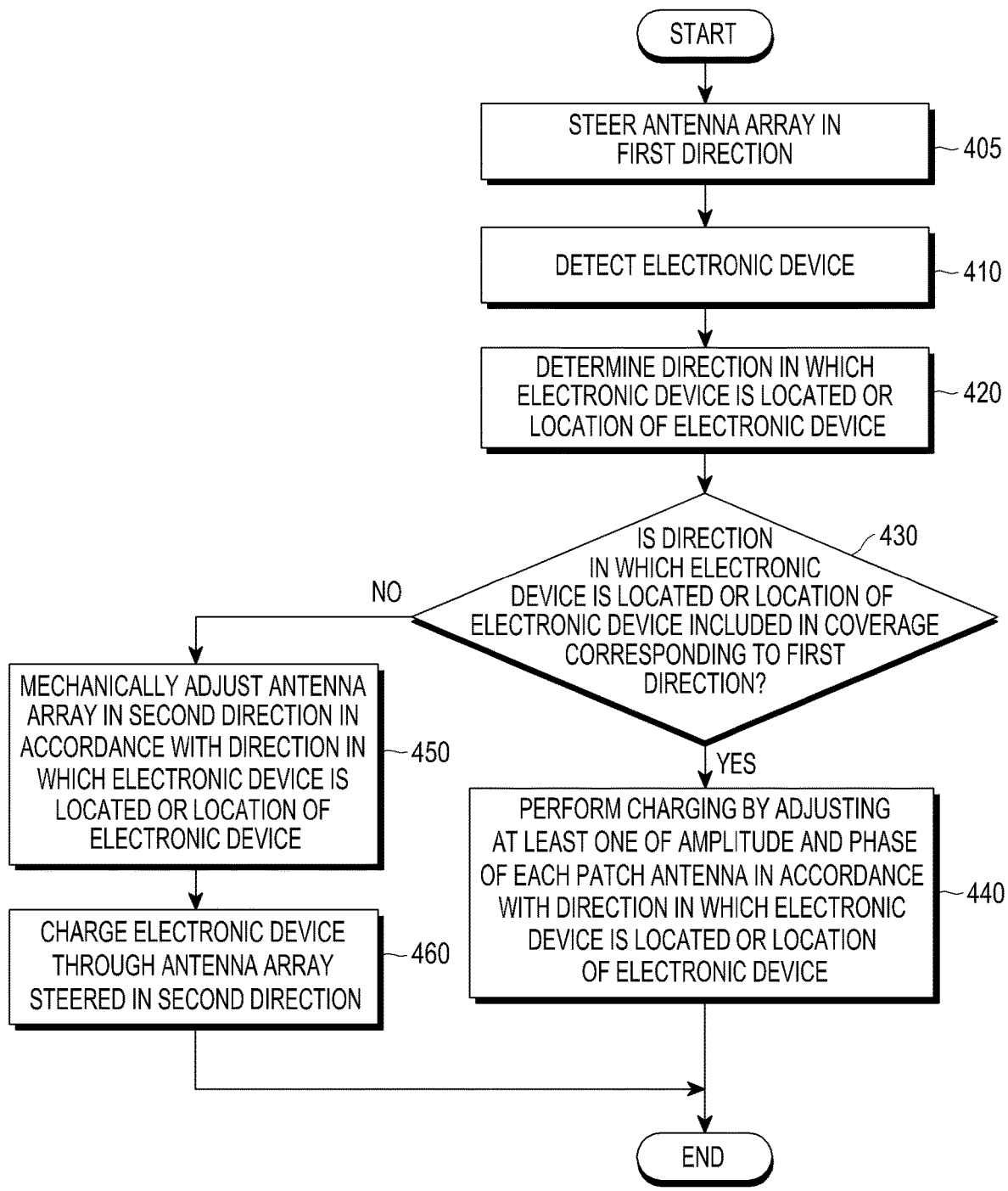
FIG. 4 is a flowchart illustrating a method of controlling a wireless power transmitter according to various embodiments of the disclosure.

FIG. 4 is a flowchart illustrating a method of controlling a wireless power transmitter according to various embodiments of the disclosure. Hereinafter, performing a particular operation by the wireless power transmitter may be understood as performing the particular operation by a processor included in the wireless power transmitter or controlling other hardware to perform the particular operation by the processor.

In operation 405, the wireless power transmitter may steer the power transmission antenna array in a first direction. The wireless power transmitter may steer the power transmission antenna array in the first direction in order to charge a previous target with relatively high efficiency, and a fully charged target may leave a charging range of the wireless power transmitter. Accordingly, the current power transmission antenna array may be steered in the first direction. Alternatively, the wireless power transmitter may steer the power transmission antenna array 130 in the first direction by default during an initial configuration process.

In operation 410, the wireless power transmitter may detect an electronic device. In operation 420, the wireless power transmitter may determine the direction in which the electronic device is located or the location of the electronic device. In operation 430, the wireless power transmitter may determine whether the direction in which the electronic device is located or the location of the electronic device is included in a coverage corresponding to a first direction. As described above, the coverage may be pre-configured as a range in which an RF wave having a gain larger than or equal to a preset threshold can be formed. That is, the coverage may be a range in which the electronic device which is charged in the first direction can be changed with power larger than or equal to a preset threshold through the RF wave. For example, it is assumed that the wireless power transmitter initially steers the power transmission antenna array in a direction of (30 degrees, 50 degrees). Among angle pairs, a first angle may be an angle of a direction of the first angle (θ) and a second angle may be an angle of a direction of the second angle (φ). Meanwhile, the coverage may be configured as, for example, an angle range of (−30 to 30 degrees, −30 to 30 degrees) with respect to a central line of the power transmission antenna array. Accordingly, the wireless power transmitter may determine that the coverage corresponding to the first direction is a value generated by adding (−30 to 30 degrees, −30 to 30 degrees) and the first direction (30 degrees, 50 degrees). Meanwhile, the wireless power transmitter may determine that the direction in which the electronic device is located is (20 degrees, 60 degrees). Accordingly, the wireless power transmitter may determine that the electronic device is included in the coverage corresponding to the first direction.

When it is determined that the electronic device is included in the coverage corresponding to the first direction, the wireless power transmitter may control at least one of the amplitude and phase of each of the patch antennas in accordance with the direction in which the electronic device is located and the location of the electronic device and transmit wireless power to the electronic device to perform charge the electronic device in operation 440. For example, the wireless power transmitter may determine (−10 degrees, 10 degrees) which is a difference between the first direction corresponding to the current steering direction and the direction in which the electronic device is located. The wireless power transmitter may control at least one of the phase and amplitude of an electrical signal input to each of the patch antennas to form the RF wave in the direction of (−10 degrees, 10 degrees) which is the determined difference. That is, the wireless power transmitter may perform beamforming in the direction of (−10 degrees, 10 degrees), that is, an electrical steering direction change.

Meanwhile, in another example, the wireless power transmitter may determine that the direction in which the electronic device is located is (−20 degrees, 10 degrees). Accordingly, the wireless power transmitter may determine that the direction in which the electronic device is located is not included in an angle range of (0 to 60 degrees, 20 to 80 degrees) which is the coverage corresponding to the first direction. When it is determined that the electronic device is not included in the coverage corresponding to the first direction, the wireless power transmitter may mechanically steer the power transmission antenna array in a second direction in accordance with the direction in which the electronic device is located or the location of the electronic device in operation 450. For example, the wireless power transmitter may change the steering direction of the power transmission antenna array by controlling at least one motor capable of changing the steering direction of the power transmission antenna array.

According to an embodiment, the wireless power transmitter may mechanically change the steering direction such that the direction of the central line of the power transmission antenna array faces the direction in which the electronic device is located. For example, the wireless power transmitter may determine (−50 degrees, −40 degrees) which is the difference between the current steering direction (30 degrees, 50 degrees) and the direction (−20 degrees, 10 degrees) in which the electronic device is located. The wireless power transmitter may mechanically change the steering direction of the power transmission antenna array by configuring the difference (−50 degrees, −40 degrees) as the mechanical steering direction change. Accordingly, the wireless power transmitter may control the steering direction of the power transmission antenna array to be the second direction, for example, (−20 degrees, 10 degrees). Accordingly, the direction of the central line of the power transmission antenna array may face the direction in which the electronic device is located. In operation 460, the wireless power transmitter may charge the electronic device through the power transmission antenna array steered in the second direction. The wireless power transmitter may control at least one of the phase and amplitude of an electrical signal input to each of the patch antennas such that the RF wave is formed in the direction of the central line of the power transmission antenna array from the second direction.

Figure 5:
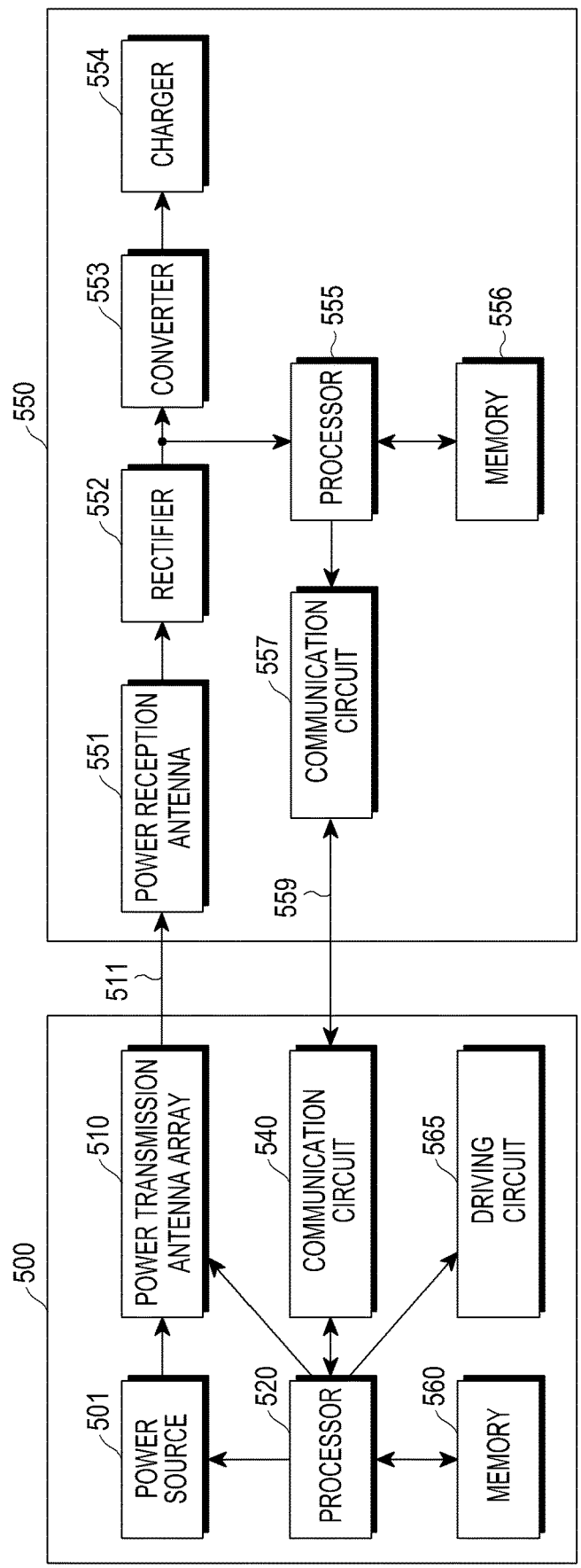
FIG. 5 is a block diagram of a wireless power transmitter and an electronic device according to various embodiments of the disclosure.

FIG. 5 is a block diagram of a wireless power transmitter and an electronic device according to various embodiments of the disclosure.

A wireless power transmitter 500 may include a power source 501, a power transmission antenna array 510, a processor 520, a communication circuit 540, a memory 560, and a driving circuit 565. Any device capable of wirelessly receiving power can be an electronic device 550, and the electronic device 550 may include a power reception antenna 551, a rectifier 552, a converter 553, a charger 554, a processor 555, a memory 556, and a communication circuit 557.

The power source 501 may provide power to be transmitted to the power transmission antenna array 510. The power source 501 may provide, for example, direct current power. In this instance, an inverter (not shown), which converts direct current power into alternating current power, and transfers the same to the power transmission antenna array 510, may be further included in the wireless power transmitter 500. Meanwhile, according to another embodiment, the power source 501 may provide alternating current power to the power transmission antenna array 510.

The power transmission antenna array 510 may include a plurality of patch antennas. For example, a plurality of patch antennas as illustrated in FIG. 1 may be included in the power transmission antenna array 510. There is no limit to the number of the plurality of patch antennas or arrangement form thereof. The power transmission antenna array 510 may form an RF wave 511 using power received from the power source 501, that is, transmit power. The power transmission antenna array 510 may form an RF wave in a particular direction according to control of the processor 520. Here, forming the RF wave 511 in the particular direction may mean controlling at least one of the amplitude and phase of sub waves in order to make the sub RF waves create constructive interference at at least one point in the particular direction. For example, the power transmission antenna array 510 may further include an amplifier, a delay element, or a phase shifter. The processor 520 may input a control signal of the amplifier, the delay element, or the phase shifter into the power transmission antenna array 510. At least one of the amplitude and phase of an electrical signal input to the power transmission antenna array 510 may be controlled, and accordingly, the RF wave 511 may be formed in a particular direction.

The processor 520 may control at least one of the phase and the amplitude of each patch antenna of the power transmission antenna array 510 using the program or algorithm stored in the memory 530.

The processor 520 may determine the direction in which the electronic device 550 is located in various ways. For example, a plurality of communication antennas included in the communication circuit 540 may receive a communication signal 559. The plurality of communication antennas may be spaced apart from each other, and accordingly, time points at which the plurality of communication antennas receives the communication signal 559 are different from each other. The processor 520 may determine the direction in which the electronic device 550 is located using the time point at which each of the plurality of communication antennas receives the communication signal 559. For example, the processor 520 may determine the direction in which the electronic device 550 is located using a relative difference between the time points at which the plurality of communication antennas receives the communication signal 559. The processor 520 may determine a relative direction of the electronic device 550 in various ways such as Time Difference Of Arrival (TDOA) and Frequency Difference Of Arrival (FDOA), but there is no limit on types of program or algorithm for determining a direction of a received signal.

The processor 520 may identify whether an object to be detected is the electronic device 550 which can be wirelessly charged or obstacles which cannot be wirelessly charged. For example, the processor 520 may identify whether the object to be detected is the electronic device 550 or the obstacle according to whether the communication signal 559 from the communication circuit 557 of the electronic device 550 is received by the communication circuit 540.

The processor 520 may determine the location in which the electronic device 550 is located and determine a formation direction of the RF wave 511 on the basis of the determined direction. That is, the processor 520 may control patch antennas of the power transmission antenna array 510 that generates sub RF waves such that the sub RF waves create constructive interface at at least one point in the determined direction.

When the direction in which the electronic device 550 is located is included in the coverage corresponding to the steering direction of the power transmission antenna array 510, the processor 520 may control the formation direction of the RF wave 511 through the power transmission antenna array 510. The processor 520 may form the RF wave 511 in the direction of the electronic device 550 by controlling the power transmission antenna array 510 on the basis of the direction of the electronic device 550.

Meanwhile, when it is determined that the direction in which the electronic device 550 is located is not included in the coverage corresponding to the steering direction of the power transmission antenna array 510, the processor 520 may control the driving circuit 565 to mechanically change the steering direction of the power transmission antenna array 510 on the basis of the direction of the electronic device 550. For example, the driving circuit 565 may include two motors as illustrated in FIGS. 3A and 3B. The processor 520 may determine a difference between the current steering direction of the power transmission antenna array 510 and the direction in which the electronic device 550 is located. The processor 520 may determine an amount of rotation of each of the two motors on the basis of the determined difference and output a control signal for rotation according to the determined amount of rotation to the driving circuit 565.

The driving circuit 565 may mechanically change the steering direction of the power transmission antenna array 510. Accordingly, the steering direction of the power transmission antenna array 510 may be actually the same as the direction in which the electronic device 550 is located. The processor 520 may control at least one of the amplitude and the phase of the electrical signal input into each of the patch antennas of the power transmission antenna array 510 such that the additionally formed RF wave 511 faces the electronic device 550. As the steering direction of the power transmission antenna array 510 is mechanically changed, the direction in which the electronic device 550 is located may be included in the coverage corresponding to the steering direction of the power transmission antenna array 510.

Meanwhile, the processor 520 may identify the electronic device 550 through information contained in the communication signal 559. The communication signal 559 may include a unique identifier or a unique address of the electronic device. The communication circuit 540 may process the communication signal 559 and may provide information to the processor 520. The communication circuit 540 may be manufactured on the basis various communication schemes, such as Wi-Fi, Bluetooth, Zig-bee, Near Field Communication (NFC), Bluetooth Low Energy (BLE), and the like, and the type of communication scheme is not limited. Meanwhile, the communication signal 559 may include rated power information of the electronic device 550, and the processor 520 may determine whether to charge the electronic device 550 on the basis of at least one of the unique identifier, the unique address, and the rated power information of the electronic device 550.

The communication signal may be used for a process in which the wireless power transmitter 500 identifies the electronic device 550, a process in which the wireless power transmitter 500 allows power transmission to the electronic device 550, a process in which the wireless power transmitter 500 makes a request for information related to reception power to the electronic device 550, and a process in which the wireless power transmitter 500 receives the information related to reception power from the electronic device 550. That is, the communication signal may be used for a subscription, command, or request process between the wireless power transmitter 500 and the electronic device 550.

Meanwhile, the processor 520 may perform control to form the RF wave 511 in the determined direction of the electronic device 550 by controlling the power transmission antenna array 510. The processor 520 may form the detection RF wave and then determine a distance to the electronic device 550 through another communication signal received as feedback. For example, the other communication signal may include a time stamp at a transmission time point. The processor 520 may determine the distance to the electronic device 550 by comparing the time stamp included in the other communication signal and a reception time point.

Accordingly, the processor 520 may determine both the direction of the electronic device 550 and the distance to the electronic device 550 and finally determine the location of the electronic device 550. The processor 520 may control the power transmission antenna array 510 such that sub RF waves generated by patch antennas at the location of the electronic device 500 create constructive interference. Accordingly, the RF wave 511 may be transferred to the power reception antenna 551 with relatively high transmission efficiency.

Any antenna capable of receiving an RF wave can be used as the power reception antenna 551. In addition, the power reception antenna 551 may be embodied in an array form including a plurality of antennas. Alternating current power received by the power reception antenna 551 may be rectified into DC power by the rectifier 552. The converter 553 may convert the direct current power into a desired voltage, and provide the same to the charger 554. The charger 554 may charge a battery (not shown). Meanwhile, although not illustrated, the converter 553 may provide converted power to a Power Management Integrated Circuit (PMIC) (not shown), and the PMIC (not shown) may provide power to various hardware elements of the electronic device 550.

Meanwhile, the processor 555 may monitor the voltage at the output end of the rectifier 552. For example, a voltmeter connected to the output end of the rectifier 552 may be further included in the electronic device 550, and the processor 555 may receive a voltage value from the voltmeter and monitor the voltage of the output end of the rectifier 552. The processor 555 may provide information including the voltage value of the output end of the rectifier 552 to the communication circuit 557. The communication circuit 557 may transmit a communication signal including information related to reception power to the power transmitter 500 through an antenna (not shown). The information related to reception power may be information associated with the magnitude of received power, such as the voltage of the output end of the rectifier 552, and may include the magnitude of the voltage or the current of the output end of the rectifier 552. In this case, it may be easily understood by those skilled in the art that an ammeter for measuring the current of the output end of the rectifier 552 or a voltmeter for measuring the voltage may be further included in the electronic device 550. The ammeter may be embodied in various forms, such as a DC ammeter, an AC ammeter, a digital ammeter, or the like, and the type of ammeter may not be limited. The voltmeter may be embodied in various forms, such as an electro dynamic instrument voltmeter, a static electricity type voltmeter, a digital voltmeter, or the like, and the type of voltmeter may not be limited. Further, the location at which the information related to reception power is measured may be any position of the electronic device 550 at which the magnitude of the received power can be measured as well as the output end of the rectifier 552.

The processor 520 or 555 may include one or more of a Central Processing Unit (CPU), an Application Processor (AP), and a Communication Processor (CP). A control circuit (not shown) may carry out, for example, operations or data processing relating to the control and/or communication of at least one other element of the electronic device 101. The control circuit (not shown) may be implemented as a Micro Control Unit (MCU) or a mini computer.

As described above, the processor 555 may transmit the communication signal 559 including identification information of the electronic device 550 to the wireless power transmitter 500. The memory 556 may store a program or an algorithm that can control various hardware elements of the electronic device 550.

Figure 6:
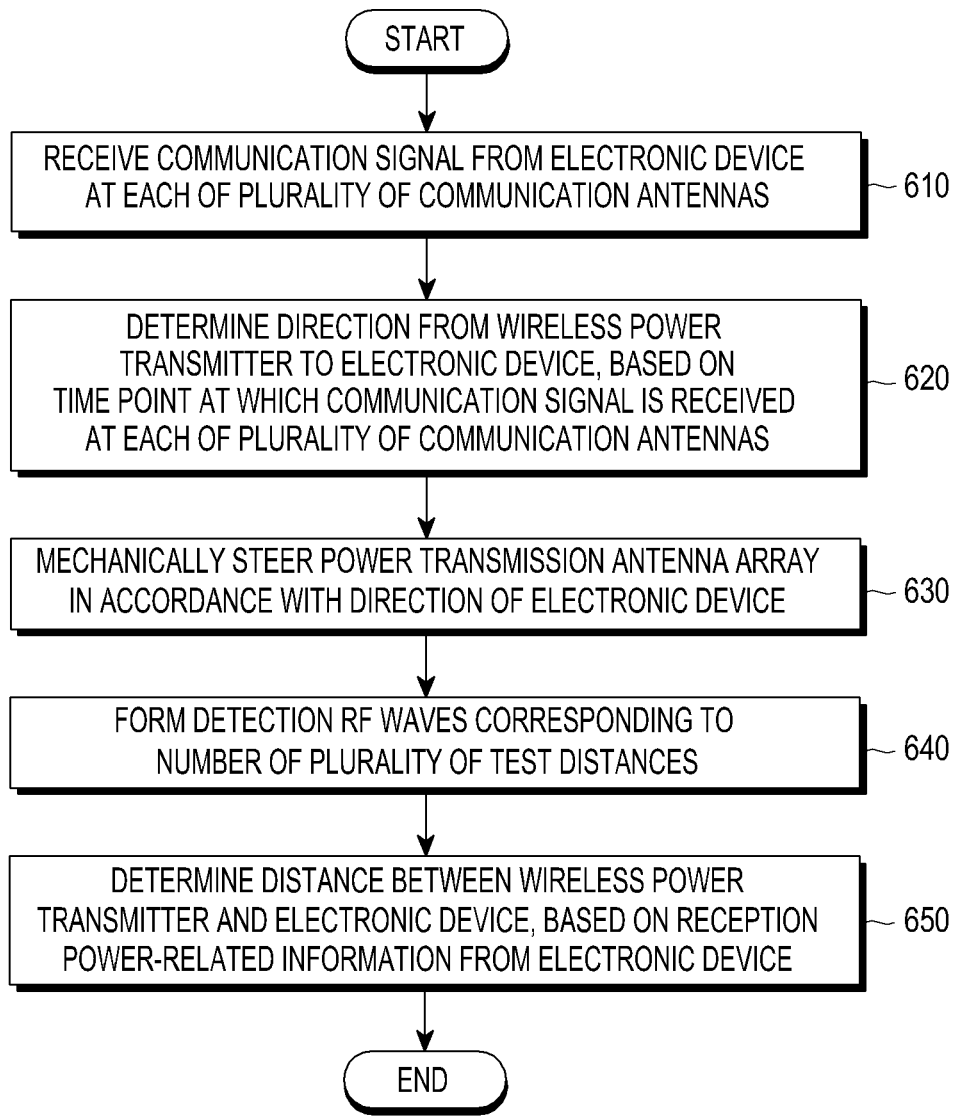
FIG. 6 is a flowchart illustrating a mechanical steering direction change of the wireless power transmitter according to various embodiments of the disclosure.

FIG. 6 is a flowchart illustrating a mechanical steering direction change of the wireless power transmitter according to various embodiments of the disclosure.

In operation 610, the wireless power transmitter may receive a communication signal from the electronic device at each of a plurality of communication antennas. As described above, the communication antennas may be physically separated from each other, and accordingly the communication signal from one electronic device may be received by the communication antennas at different time points. In operation 620, the wireless power transmitter may determine a direction from the wireless power transmitter to the electronic device on the basis of a reception time point of the communication signal at each of the plurality of communication antennas. For example, the wireless power transmitter may determine the direction from the wireless power transmitter to the electronic device using a difference between reception time points of the communication signal by the plurality of communication antennas.

In operation 630, the wireless power transmitter may mechanically steer the power transmission antenna array in accordance with the direction of the electronic device. For example, the wireless power transmitter may determine that the direction of the electronic device is not included in the coverage corresponding to the steering direction of the power transmission antenna array and may control the steering direction of the power transmission antenna array such that the direction of the electronic device is included in the coverage.

In operation 640, the wireless power transmitter may form a number of detection RF waves corresponding to a plurality of test distances. The wireless power transmitter may control at least one of the amplitude and the phase of the electrical signal input to the patch antenna such that the RF wave is formed in the direction of the electronic device on the basis of the direction of the electronic device with respect to the power transmission antenna array.

In operation 650, the wireless power transmitter may determine the distance between the wireless power transmitter and the electronic device or maintain formation of the RF wave on the basis of information related to reception power from the electronic device. This will be described in more detail with reference to FIG. 7.

Figure 7:
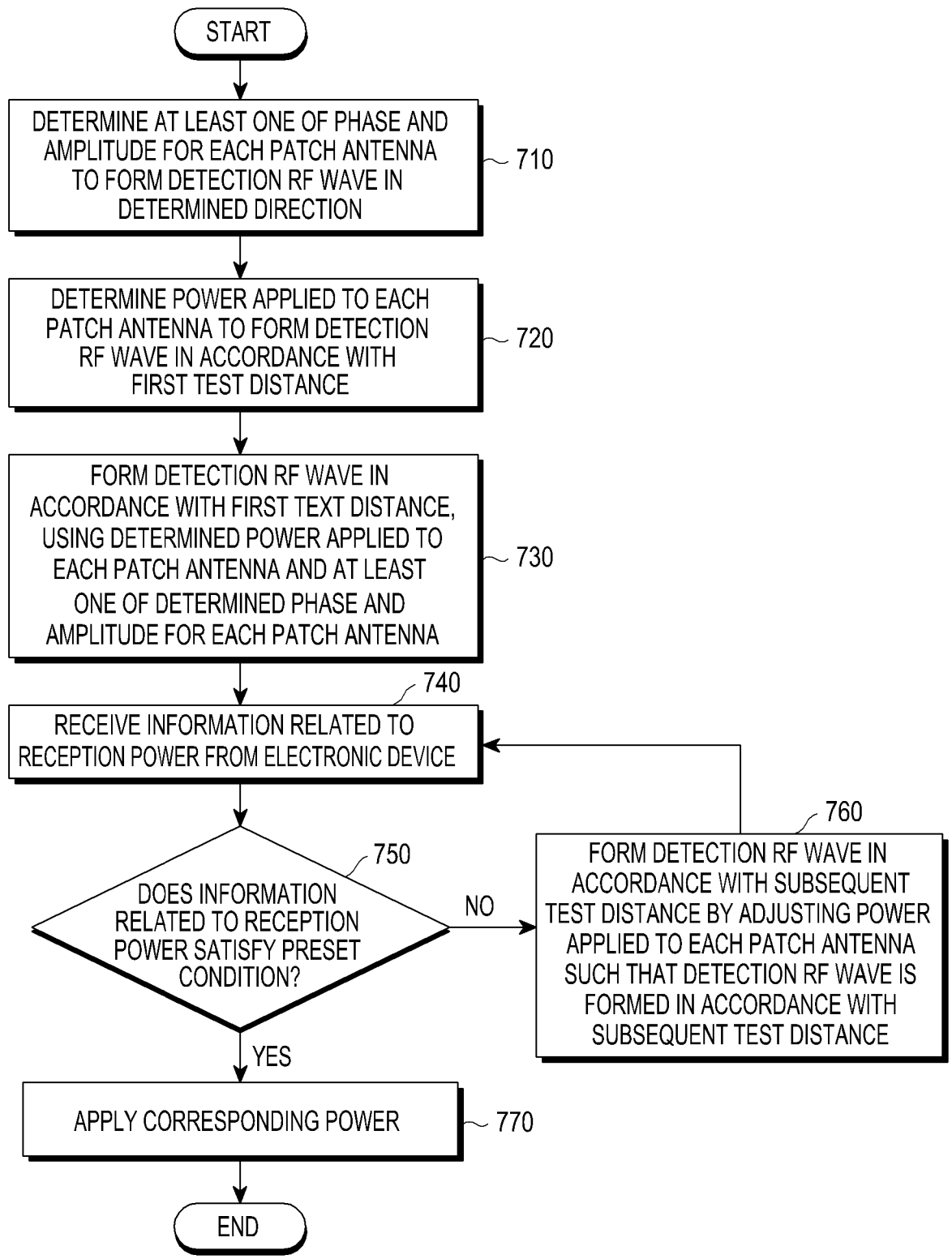
FIG. 7 is a flowchart illustrating a method of controlling the wireless power transmitter according to various embodiments of the disclosure.
Figure 8:
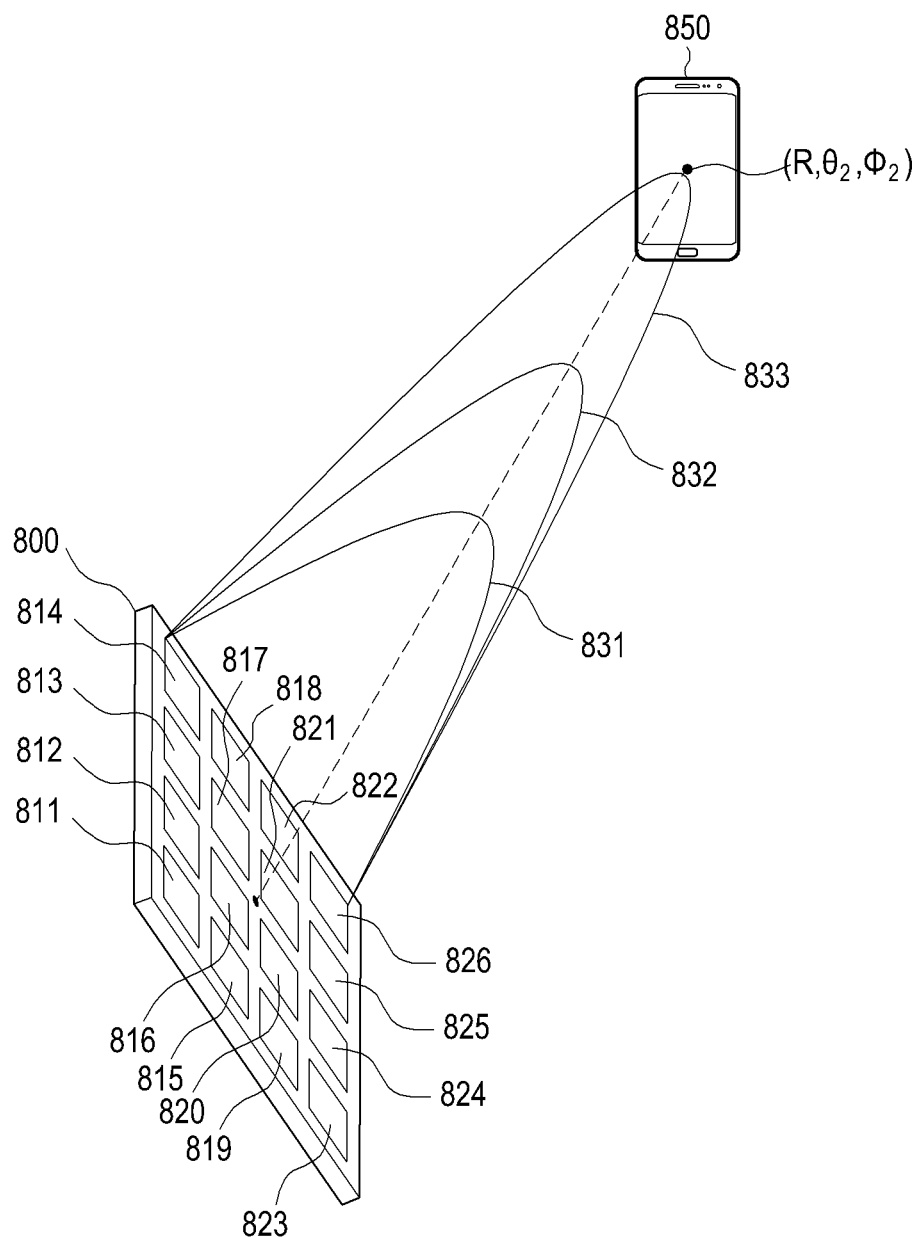
FIG. 8 is a conceptual diagram illustrating the configuration for determining a distance between the wireless power transmitter and the electronic device according to various embodiments of the disclosure.

FIG. 7 is a flowchart illustrating a method of controlling the wireless power transmitter according to various embodiments of the disclosure. The embodiment of FIG. 7 will be described in more detail with reference to FIG. 8. FIG. 8 is a conceptual diagram illustrating the configuration of determining a distance between the wireless power transmitter and an electronic device 850 according to various embodiments of the disclosure.

In operation 710, for example, as illustrated in FIG. 8, a wireless power transmitter 800 may determine at least one of the phase and the amplitude of a sub RF wave oscillating for each of patch antennas 811 to 826 to form a detection RF wave in a determined direction (θ2,φ2). It is assumed that the wireless power transmitter 800 mechanically controls in advance a steering direction of an antenna array such that the direction of the electronic device 850 is included in the coverage.

For example, when it is determined that the electronic device 850 is disposed on the relatively right side of the wireless power transmitter 800, sub RF waves from the plurality of patch antennas 811 to 826 may create constructive interference on the relatively right side through the application of a relatively large delay to sub RF waves generated by patch antennas disposed on the relatively right side. That is, sub RF waves from patch antennas disposed on the relatively right side may oscillate later than sub RF waves from patch antennas disposed on the relatively left side, and accordingly, the sub RF waves from the patch antennas may simultaneously meet, that is, create constructive interference at a point on the relatively right side. Meanwhile, as described above, the wireless power transmitter 800 may form sub RF waves from all the patch antennas 811 to 826 at actually the same time point. In this case, the wireless power transmitter 800 may make the sub RF waves create constructive interference on the relatively right side by controlling the phase of the sub RF waves oscillating for the respective patch antennas 811 to 826. The embodiment of FIG. 8 may be the state in which the wireless power transmitter 800 mechanically controls the steering direction of the power transmission antenna array in order to make the steering direction of the power transmission antenna array actually be the same as the direction of the electronic device 850. Accordingly, the wireless power transmitter 800 may control at least one of the amplitude and the phase of the electrical signal input to the patch antennas 811 to 826 such that the sub RF waves create constructive interference at at least one point on the central line of the power transmission antenna array.

In operation 720, the wireless power transmitter 800 may determine the magnitude of power applied to each of the patch antennas 811 to 826 such that a detection RF wave 831 is formed in accordance with a first test distance. According to various embodiments of the disclosure, the wireless power transmitter 800 may determine the magnitude of first test power provided to the plurality of patch antennas 811 to 826 directly without determining the distance. Here, the first test distance or the magnitude of the first test power may be a default value.

In operation 730, the wireless power transmitter 800 may form the detection RF wave 831 in accordance with the first test distance, using the determined power applied for each of the patch antennas 811 to 826 and at least one of the determined phase and the determined amplitude of each of the patch antennas 811 to 826, and.

In operation 740, the wireless power transmitter 800 may receive information related to power, that is, information related to reception power received from the electronic device 850. In operation 750, the wireless power transmitter 800 may determine whether the information related to reception power satisfies a predetermined condition. For example, the wireless power transmitter 800 may determine whether voltage at an output end of a rectifier of the electronic device 850, which corresponds to the information related to reception power, exceeds a predetermined threshold value.

When the information related to reception power does not satisfy the predetermined condition, the wireless power transmitter 800 may adjust power applied for each of the patch antennas 811 to 826 such that a detection RF wave 832 is formed in accordance with a subsequent test distance, whereby the detection RF wave 832 may be formed in accordance with the subsequent test distance in operation 760.

As described above, the wireless power transmitter 800 may immediately determine the magnitude of subsequent test power without determining a test distance, and may apply the same to each of the patch antennas 811 to 826. Meanwhile, the embodiment of FIG. 8 illustrates that the wireless power transmitter 800 increases the text distance, that is, the magnitude of applied power, but is only an example, and the wireless power transmitter 800 may decrease the text distance, that is, the magnitude of applied power. The wireless power transmitter 800 may adjust the magnitude of power applied to each of the patch antennas 811 to 826 until information related to reception power satisfies the predetermined condition.

When the information related to reception power satisfies the predetermined condition, the wireless power transmitter 800 may perform wireless charging by maintaining power applied for each patch antenna for transmitting the RF wave in operation 770. In the embodiment of FIG. 8, when the RF wave 833 is formed with a third test distance, it may be determined that the information related to reception power satisfies the predetermined condition. The wireless power transmitter 800 may maintain the magnitude of power applied to each of the patch antennas 811 to 826 such that the formation of the RF wave 833 is maintained to correspond to the third test distance. The wireless power transmitter 800 may determine that the distance to the electronic device 850 is a third text distance (R) or may control only power applied to each of the patch antennas 811 to 826 without determining the distance to the electronic device 850.

According to the above description, the wireless power transmitter 800 may determine the distance to the electronic device 850 and control the patch antennas such that sub RF waves create constructive interference at the corresponding point, so that power may be wirelessly transmitted with relatively high transmission efficiency.

Figure 9:
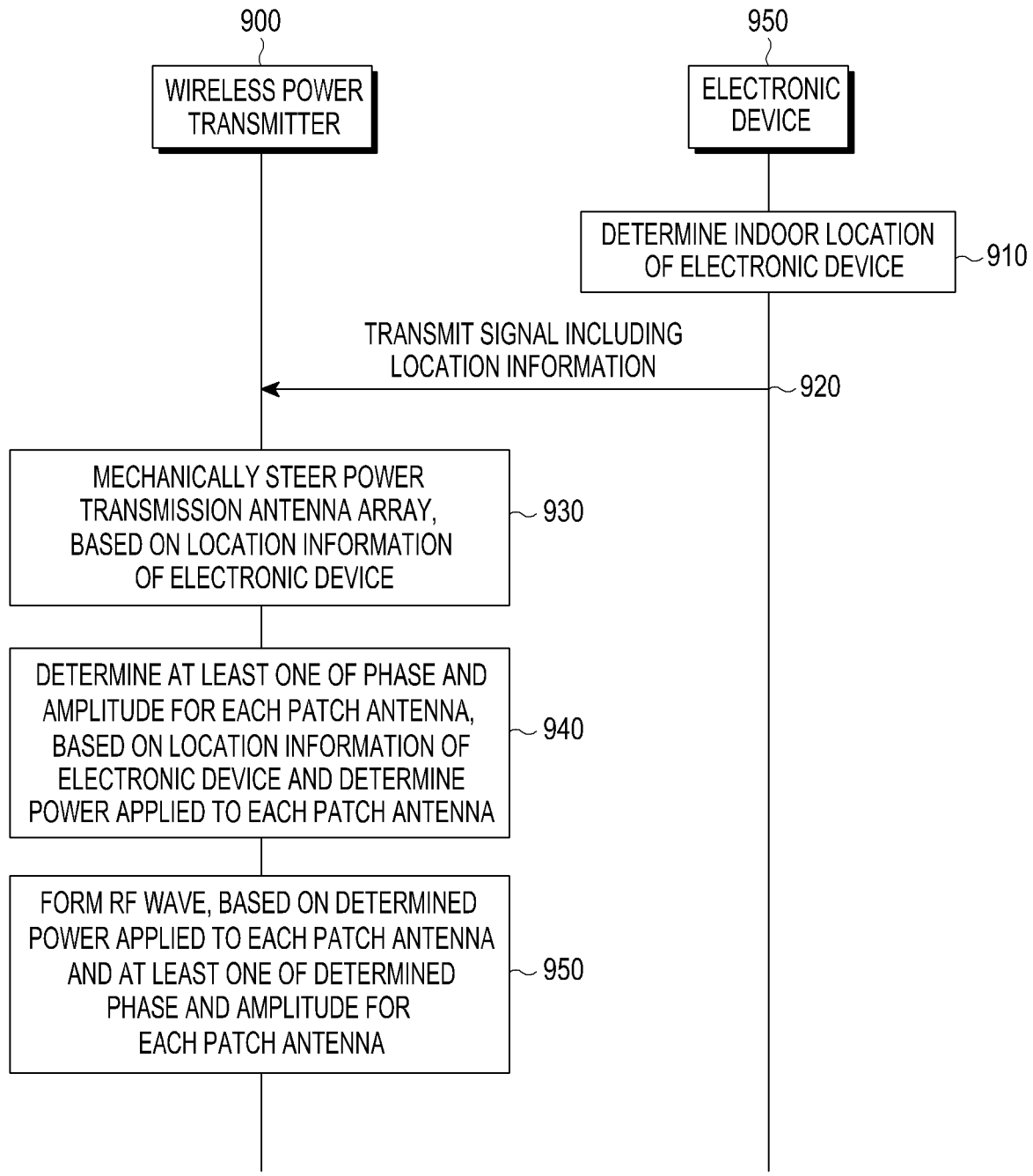
FIG. 9 is a flowchart illustrating a method of controlling the wireless power transmitter according to various embodiments of the disclosure.

FIG. 9 is a flowchart illustrating a method of controlling a wireless power transmitter according to various embodiments of the disclosure.

In operation 910, the electronic device 950 may determine the indoor location of an electronic device 950 by itself. For example, the electronic device 950 may acquire an indoor geomagnetic map and compare sensing data acquired through a geomagnetic sensor with the geomagnetic map. The electronic device 950 may determine the indoor location of the electronic device 950 on the basis of the comparison result. Alternatively, the electronic device 950 may determine the indoor location of the electronic device 950 on the basis of a Wi-Fi signal-based indoor positioning scheme. Alternatively, when the electronic device 950 is disposed outdoors, the location of the electronic device 950 may be determined using a GPS module. In operation 920, the electronic device 950 may transmit a signal including location information to the wireless power transmitter 900.

In operation 930, the wireless power transmitter 900 may mechanically steer the power transmission antenna array on the basis of the location information of the electronic device 950. For example, the wireless power transmitter 900 may mechanically steer the power transmission antenna array such that the electronic device 950 is included in the coverage.

In operation 940, the wireless power transmitter 900 may determine at least one of the phase and the amplitude of the electrical signal input to each patch antenna on the basis of the location information of the electronic device 950 and determine power applied to each patch antenna. In operation 950, the wireless power transmitter 900 may form the RF wave based on the determined power applied to each patch antenna and at least one of the determined phase and amplitude for each patch antenna As described above, the wireless power transmitter 900 according to various embodiments of the disclosure may adjust the steering direction of the power transmission antenna array through the location information directly received from the electronic device 950 or control at least one of the phase and the amplitude of the electrical signal input to each of the patch antennas.

Figure 10:
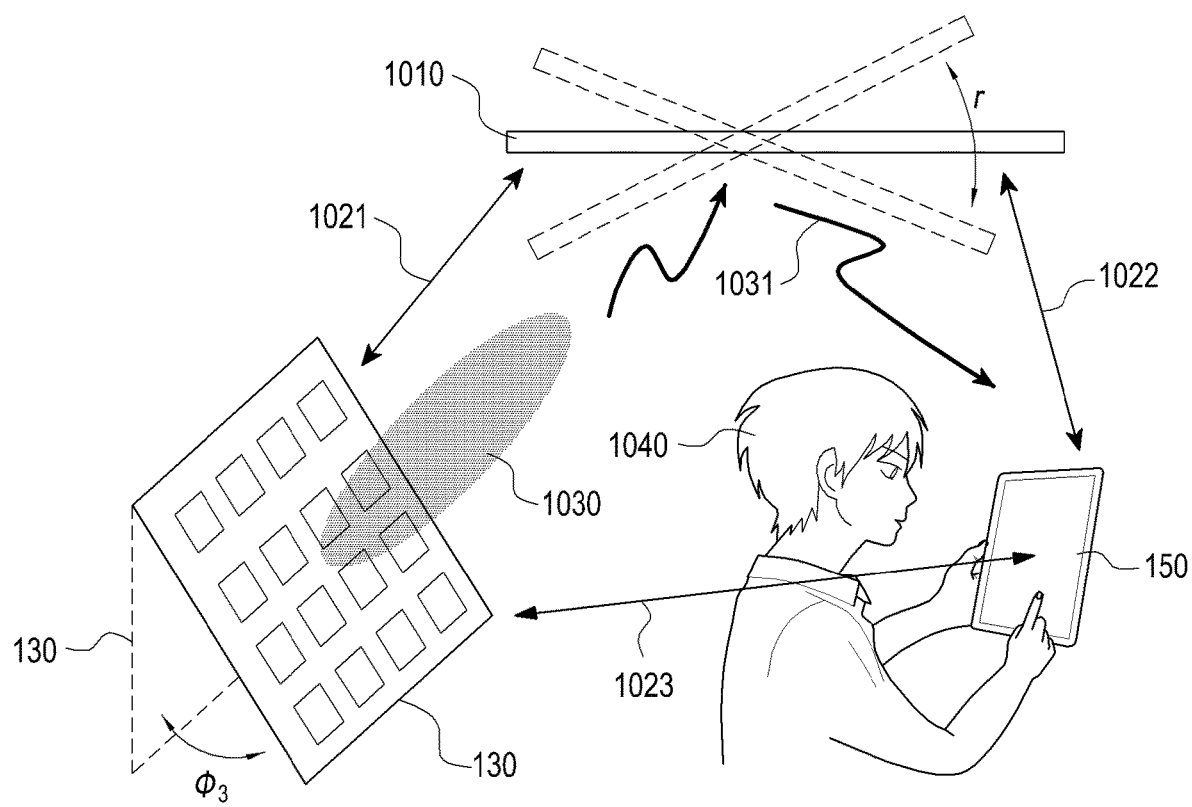
FIG. 10 is a conceptual diagram illustrating wireless charging using the wireless power transmitter and a reflecting plate according to various embodiments of the disclosure.

FIG. 10 is a conceptual diagram illustrating wireless charging using a wireless power transmitter and a reflecting plate according to various embodiments of the disclosure.

Referring to FIG. 10, the wireless power transmitter may determine that there is an obstacle 1040 between the electronic device 150 and the power transmission antenna array 130 of the wireless power transmitter. A method by which the wireless power transmitter detects the obstacle 1040 between the electronic device 150 and the power transmission antenna array 130 will be described below in more detail.

In this case, the wireless power transmitter does not form the RF wave to directly face the electronic device 150. When the obstacle 1040 is located between the power transmission antenna array 130 and the electronic device 150, charging efficiency may be reduced due to RF waves, and thus the wireless power transmitter may form RF waves through a detour path. According to various embodiments of the disclosure, the wireless power transmitter may mechanically change the steering direction of the power transmission antenna array 130 by φ3 in a direction of a second angle (φ).

The wireless power transmitter may change the steering direction of the power transmission antenna array 130 such that the RF wave 1030 faces the reflecting plate 1010.

The reflecting plate 1010 may include a conductor and reflect the incident RF wave 1030. The reflected RF wave 1031 may proceed to the electronic device 150. Accordingly, the RF wave 1030 may make a detour to avoid the obstacle 1040 and proceed to the electronic device 150. Meanwhile, the reflecting plate 1010 can rotate in a direction of a third angle (r). The reflecting plate 1010 may include a communication circuit (not shown), a processor (not shown) capable of performing operations, and a driving circuit (not shown). The communication circuit (not shown) of the reflecting plate 1010 may receive a communication signal 1021 from the wireless power transmitter. Alternatively, the communication circuit (not shown) of the reflecting plate 1010 may receive a communication signal 1022 from the electronic device 150.

According to various embodiments of the disclosure, the reflecting plate 1010 may receive the communication signal 1021 including information on an amount of rotation in the direction of the third angle (r). The wireless power transmitter may receive a communication signal 1023 including information related to reception power from the electronic device 150. When the information related to reception power does not satisfy a predetermined condition, the wireless power transmitter may transmit the communication signal 1021 including information on the amount of rotation to the reflecting plate 1010 to rotate the reflecting plate 1010. For example, the wireless power transmitter may receive the communication signal 1023 including information indicating that voltage at the output end of the rectifier of the electronic device 150 is lower than a threshold value. The wireless power transmitter may determine that the electronic device 150 cannot receive sufficient power, and accordingly may transmit the communication signal 1021 indicating further rotation of the reflecting plate 1010 to the reflecting plate 1010. According to another embodiment, the wireless power transmitter may be connected to the reflecting plate 1010 through a wire and may perform control to rotate the reflecting plate 1010 through the wired connection. The reflecting plate 1010 may rotate in the direction of the third angle (r) until the information related to reception power satisfies the predetermined condition. When it is determined that the information related to reception power satisfies the predetermined condition, the wireless power transmitter may perform control to maintain the corresponding angle. Meanwhile, the embodiment of FIG. 10 illustrates that the reflecting plate 1010 can rotate in one direction but is only for convenience of description, and the reflecting plate 1010 may rotate in two orthogonal directions, that is, three-dimensionally like the power transmission antenna array of the wireless power transmitter.

According to another embodiment, the communication circuit (not shown) of the reflecting plate 1010 may receive the communication signal 1022 including information related to reception power from the electronic device 150. When the information related to reception power does not satisfy the predetermined condition, the processor (not shown) of the reflecting plate 1010 may control the driving circuit (not shown) to rotate in the direction of the third angle (r). The reflecting plate 1010 may rotate until the information related to reception power satisfies the predetermined condition. When the information related to reception power satisfies the predetermined condition, the reflecting plate 1010, for example, the processor (not shown) of the reflecting plate 1010 may maintain the corresponding angle.

According to various embodiments of the disclosure, the wireless power transmitter may form a relatively small RF wave which is harmless to humans before determining the steering direction of the power transmission antenna array and the steering direction of the reflecting plate 1010. When the steering direction of the power transmission antenna array and the steering direction of the reflecting plate 1010 are determined for the detour path, the wireless power transmitter may form a relatively large RF wave for charging.

As described above, the reflecting plate 1010 may determine the amount of rotation by itself and may rotate or may receive information on the amount of rotation from the wireless power transmitter and may rotate on the basis thereof.

Figure 11:
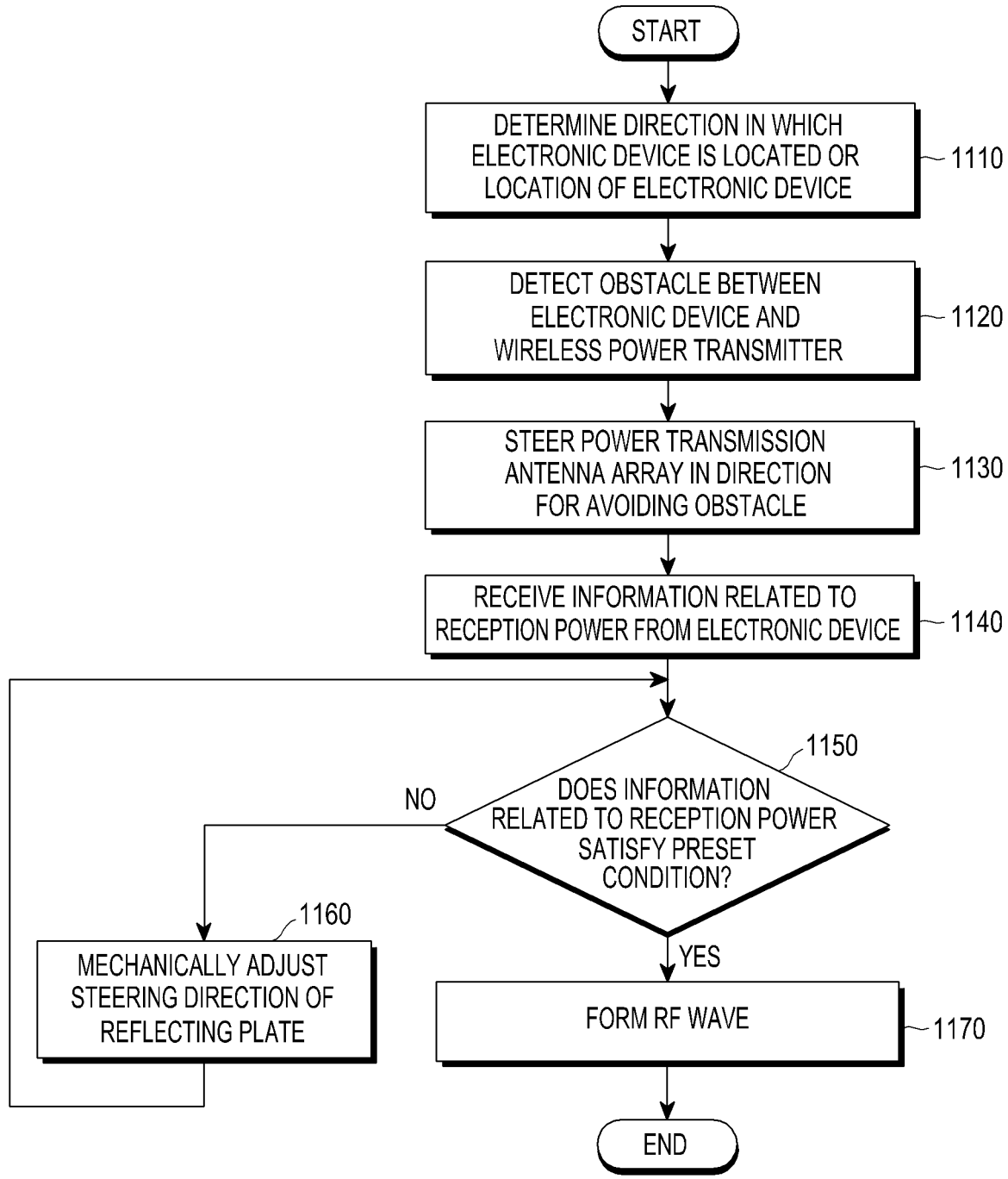
FIG. 11 is a flowchart illustrating a method of controlling the wireless power transmitter according to various embodiments of the disclosure.

FIG. 11 is a flowchart illustrating a method of controlling a wireless power transmitter according to various embodiments of the disclosure.

In operation 1110, the wireless power transmitter may determine the direction in which the electronic device is located or the location of the electronic device. In operation 1120, the wireless power transmitter may determine an obstacle between the electronic device and the wireless power transmitter. In operation 1130, the wireless power transmitter may steer a power transmission antenna array in a direction to avoid the obstacle. The wireless power transmitter may mechanically change the steering direction of the power transmission antenna array. According to various embodiments of the disclosure, the wireless power transmitter may steer the power transmission antenna array in a direction in which the formed RF wave faces the reflecting plate. The wireless power transmitter may select one of a plurality of reflecting plate candidates on the basis of the location of the obstacle, and may mechanically adjust the steering direction of the power transmission antenna array such that the RF wave is formed by the selected reflecting plate. The wireless power transmitter may control at least one of the phase and the amplitude of the electrical signal input to each patch antenna of the antenna array such that an additional RF wave is formed in the direction of the reflecting plate. Accordingly, the wireless power transmitter may form the RF wave by the reflecting plate.

In operation 1140, the wireless power transmitter may receive information related to reception power from the electronic device. In operation 1150, the wireless power transmitter may determine whether the information related to reception power satisfies a predetermined condition. For example, the wireless power transmitter may determine whether voltage at an output end of the rectifier of the electronic device exceeds a predetermined threshold value. When it is determined that the information related to reception power does not satisfy the predetermined condition, the wireless power transmitter may perform control to mechanically adjust the steering direction of the reflecting plate in operation 1160. For example, the wireless power transmitter may transmit a rotation control signal including an amount of rotation of the reflecting plate to the reflecting plate and the reflecting plate may rotate on the basis of the rotation control signal. Alternatively, the wireless power transmitter may control the reflecting plate to rotate by outputting a control signal to a driving circuit of the reflecting plate connected thereto through a wire. The wireless power transmitter may control the reflecting plate to rotate until the information related to reception power satisfies the predetermined condition. When it is determined that the information related to reception power satisfies the predetermined condition, the wireless power transmitter may maintain formation of the RF wave in operation 1170.

Figure 12:
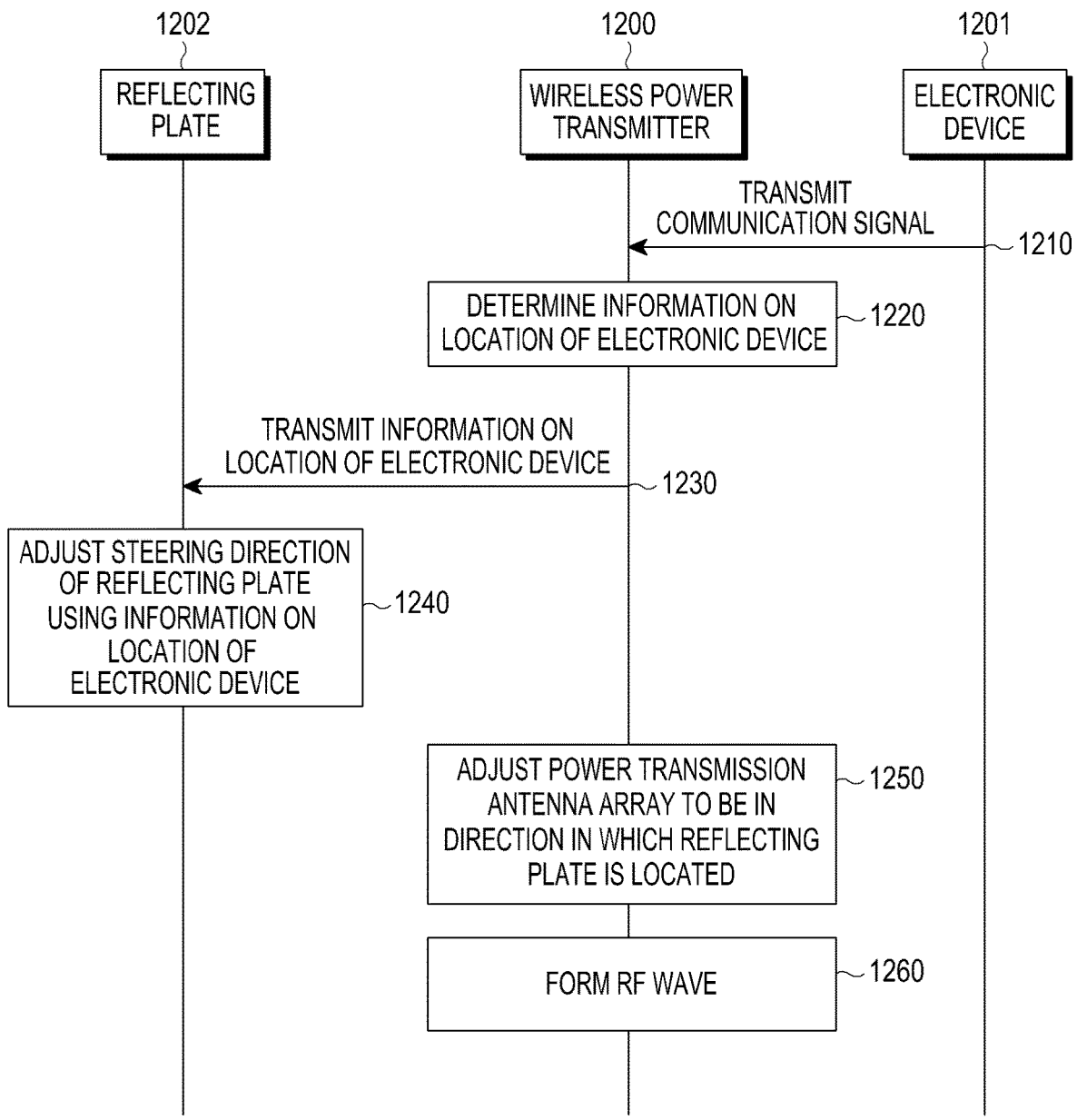
FIG. 12 is a flowchart illustrating operations of a wireless power transmitter, an electronic device, and a reflecting plate according to various embodiments of the disclosure.

FIG. 12 is a flowchart illustrating operations of a wireless power transmitter, an electronic device, and a reflecting plate according to various embodiments of the disclosure.

In operation 1210, the electronic device 1201 may transmit a communication signal to a wireless power transmitter 1200. In operation 1220, the wireless power transmitter 1200 may determine information on the location of the electronic device 1201. For example, the wireless power transmitter 1200 may determine the direction in which the electronic device 1201 is located on the basis of a difference between time points at which a plurality of communication antennas receives a communication signal. Alternatively, the wireless power transmitter 1200 may receive a communication signal including information on the location which the electronic device 1201 determines by itself or may determine information on the location of the electronic device 1201 on the basis of information included in the communication signal.

In operation 1230, the wireless power transmitter 1200 may transmit the communication signal including information on the location of the electronic device 1201 to the reflecting plate 1202. As described above, the reflecting plate 1202 may include a communication circuit and may receive the communication signal including information on the location of the electronic device 1201 from the wireless power transmitter 1200 through the communication circuit. Alternatively, the reflecting plate 1202 may receive the communication signal including information on the location of the electronic device 1201 from the electronic device 1201.

In operation 1240, the reflecting plate 1202 may adjust the steering direction of the reflecting plate 1202 using information on the location of the electronic device 1201. In operation 1250, the wireless power transmitter 1200 may adjust the power transmission antenna array to be in the direction of the reflecting plate 1202. In operation 1260, the wireless power transmitter 1200 may form the RF wave, and the RF wave from the wireless power transmitter 1200 may be reflected by the reflecting plate 1202 and transferred to the electronic device 1201.

Figure 13:
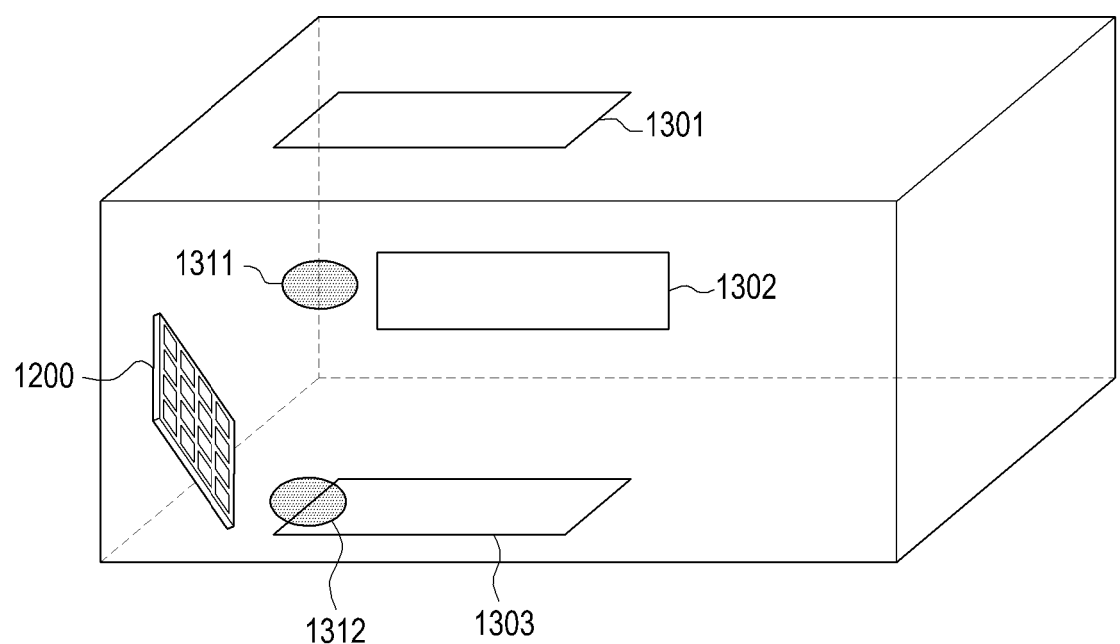
FIG. 13 is a conceptual diagram illustrating an environment in which a plurality of reflecting plates exists according to various embodiments of the disclosure.

FIG. 13 is a conceptual diagram illustrating an environment in which a plurality of reflecting plates exists according to various embodiments of the disclosure.

As illustrated in FIG. 13, a plurality of reflecting plates 1301 to 1303 may be disposed in one region. For example, the reflecting plates 1301 to 1303 may be located on indoor ceiling, wall, and bottom. The wireless power transmitter 1200 may determine a direction of an obstacle 1311 or 1312. When an attenuation degree of an intensity of a communication signal from a particular direction exceeds a threshold value, the wireless power transmitter 1200 may determine that an obstacle is located in the corresponding direction. Alternatively, when a difference between time points at which a plurality of communication signals is received in a particular direction exceeds a threshold value, the wireless power transmitter 1200 may determine that an obstacle is located in the corresponding direction. A configuration for detecting the obstacle will be described below in more detail with reference to FIGS. 15A to 17.

The wireless power transmitter 1200 may select a reflecting plate capable of reflecting the RF wave by avoiding the obstacle according to a direction in which the obstacle is located. For example, the wireless power transmitter 1200 may select the reflecting plate 1303 capable of delivering the RF wave by avoiding the obstacle 1311 in accordance with the direction of the obstacle 1311. Alternatively, the wireless power transmitter 1200 may select the reflecting plate 1301 capable of delivering the RF wave by avoiding the obstacle 1312 in accordance with the direction of the obstacle 1312. For example, the wireless power transmitter 1200 may store relation information between the direction of the obstacle and the reflecting plate to be selected. The wireless power transmitter may select at least one of a plurality of reflecting plates by comparing relation information containing the direction of the detected obstacle.

Figure 14:
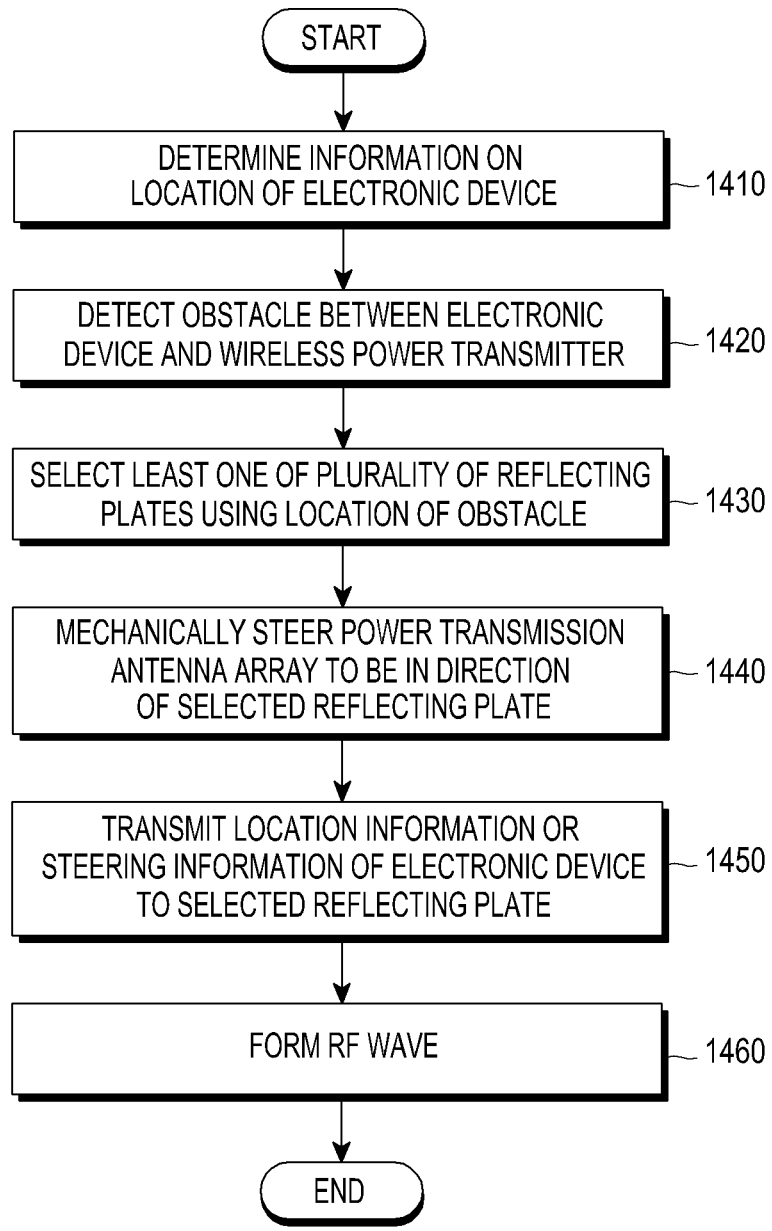
FIG. 14 is a flowchart illustrating a method of controlling the wireless power transmitter according to various embodiments of the disclosure.

FIG. 14 is a flowchart illustrating a method of controlling a wireless power transmitter according to various embodiments of the disclosure.

In operation 1410, the wireless power transmitter may determine information on the location of the electronic device. In operation 1420, the wireless power transmitter may detect an obstacle between the electronic device and the wireless power transmitter. As described above, the wireless power transmitter may detect the obstacle on the basis of an attenuation degree of a communication signal from the electronic device or detect the obstacle on the basis of a difference between time points at which a plurality of communication signals is received.

In operation 1430, the wireless power transmitter may select at least one of a plurality of reflecting plates through the location of the obstacle. In operation 1440, the wireless power transmitter may mechanically steer the power transmission antenna array to be in the direction of the selected reflecting plate. In operation 1450, the wireless power transmitter may transmit location information or steering information of the electronic device to the selected reflecting plate. The selected reflecting plate may adjust the steering direction of the reflecting plate on the basis of location information or steering information of the electronic device. In operation 1460, the wireless power transmitter may form an RF wave. The wireless power transmitter may perform control to transfer the RF wave to the reflecting plate by controlling at least one of the amplitude and the phase of the electrical signal input to each patch antenna.

Figure 15A:
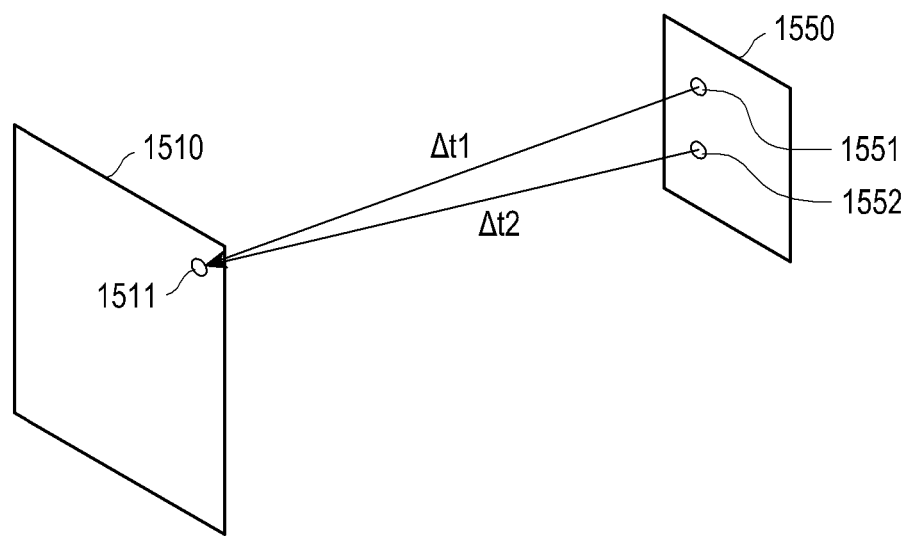
FIGS. 15A and 15B are conceptual diagrams illustrating a method of detecting an obstacle.
Figure 15B:
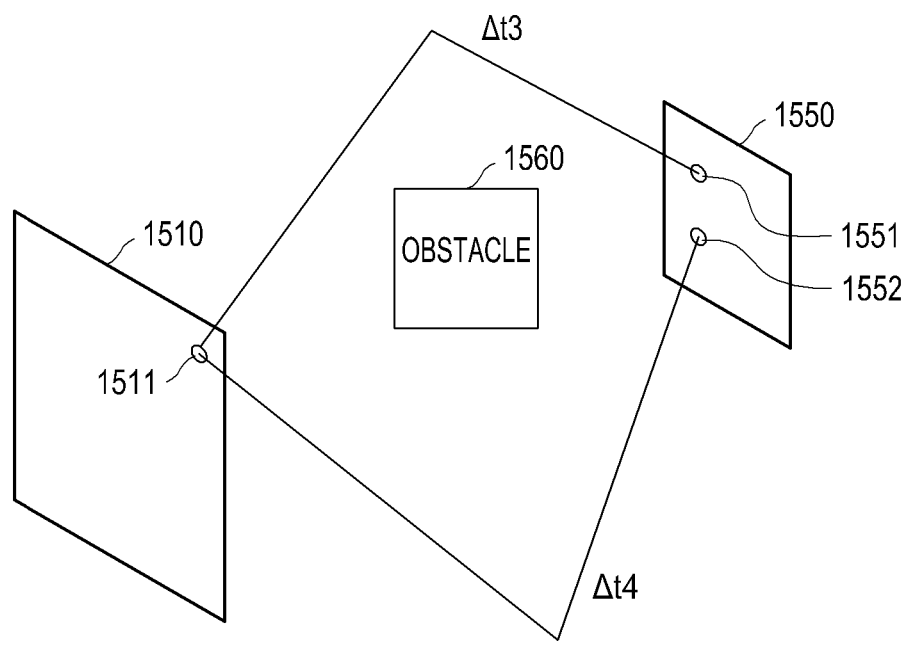

FIGS. 15A and 15B are conceptual diagrams illustrating a method of detecting an obstacle. A wireless power transmitter 1510 may include a communication antenna 1511 and an electronic device 1550 may include a plurality of communication antennas 1551 and 1552. It may take a first time ($\Delta t1$) until a first communication signal transmitted by the communication antenna 1551 is received by the communication antenna 1511. It may take a second time ($\Delta t2$) until a second communication signal transmitted by the communication antenna 1552 is received by the communication antenna 1511. If there is no separate obstacle between the electronic device 1550 and the wireless power transmitter 1510, difference between the first time ($\Delta t1$) and the second time ($\Delta t2$) is not large. Meanwhile, as illustrated in FIG. 15B, an obstacle 1560 may be disposed between the wireless power transmitter 1510 and the electronic device 1550. In this case, communication signals may make a detour to avoid the obstacle 1560 and may be received by the communication antenna 1511. Accordingly, it may take a third time ($\Delta t3$) until the first communication signal transmitted by the communication antenna 1551 is received by the communication antenna 1511. It may take a fourth time ($\Delta t4$) until the second communication signal transmitted by the communication antenna 1552 is received by the communication antenna 1511. In this case, a difference between the third time ($\Delta t3$) and the fourth time ($\Delta t4$) may be relatively large. This is due to a difference between paths of the first communication signal and the second communication signal. As a result, when it is determined that the difference between time points at which the first communication signal and the second communication signal are received is larger than a threshold, the wireless power transmitter 1510 may determine that the obstacle 1560 is disposed between the electronic device 1550 and the wireless power transmitter 1510.

Figure 16:
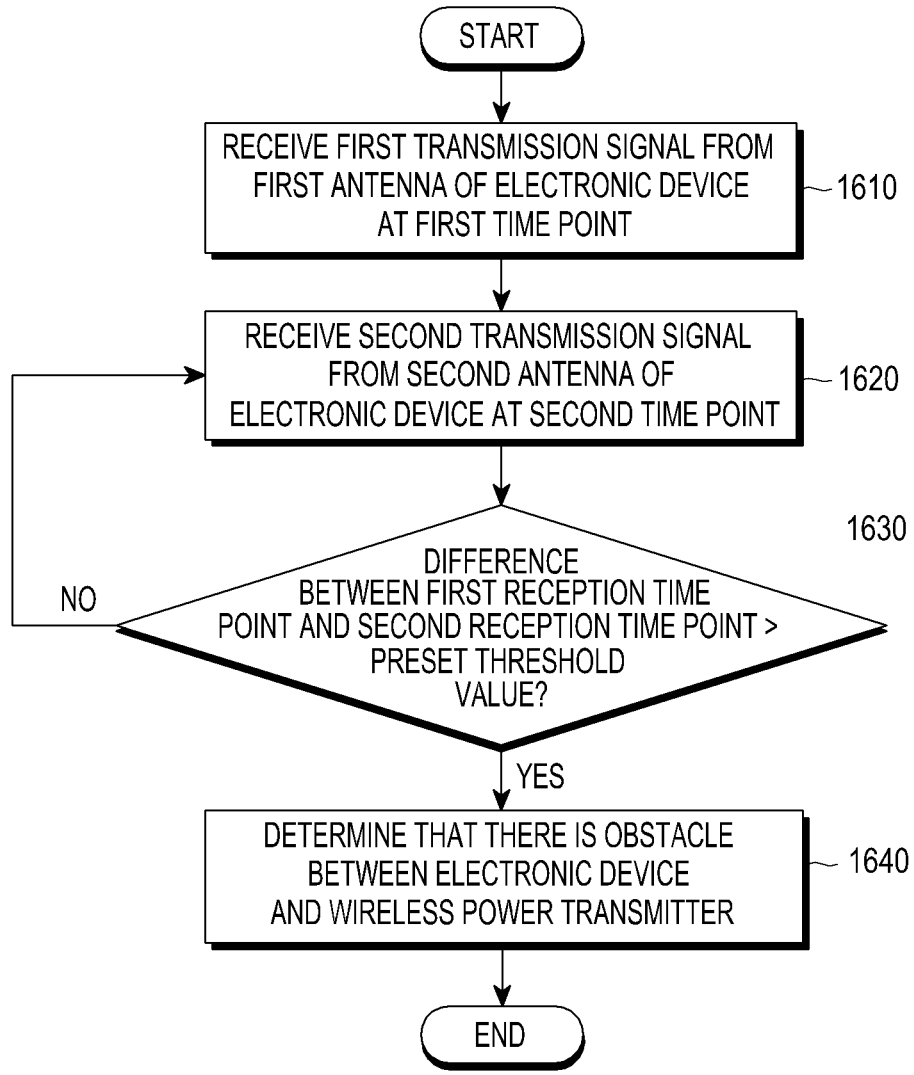
FIG. 16 is a flowchart illustrating a method of detecting an obstacle according to various embodiments of the disclosure.

FIG. 16 is a flowchart illustrating a method of detecting an obstacle according to various embodiments of the disclosure.

In operation 1610, the wireless power transmitter may receive a first transmission signal from a first antenna of the electronic device at a first time point. In operation 1620, the wireless power transmitter may receive a second transmission signal from a second antenna of the electronic device at a second time point. The electronic device according to various embodiments of the disclosure may be configured to first transmit the first transmission signal to the first antenna and, after a preset time, transmit the second transmission signal to the second antenna. The preset time may be pre-stored in the wireless power transmitter. Each of the first transmission signal and the second transmission signal may include identification information indicating transmission from the first antenna or the second antenna.

In operation 1630, the wireless power transmitter may determine whether a difference between a first reception time point and a second reception time point is larger than a preset threshold. As illustrated in FIGS. 15A and 15B, if there is no obstacle, the difference between the first reception time point and the second reception time point may be little different from the preset time. That is, if there is no obstacle, the first transmission signal and the second transmission signal may be received actually at the same time. The preset threshold may be configured as a value generated by adding the preset time and a value indicating actually the simultaneous reception of the first transmission signal and the second transmission signal.

When it is determined that the difference between the first reception time point and the second reception time point is larger than the preset threshold, the wireless power transmitter may determine that an obstacle is disposed between the electronic device and the wireless power transmitter in operation 1640. When it is determined that the difference between the first reception time point and the second reception time point is not larger than the preset threshold, the wireless power transmitter may determine that the obstacle is not disposed between the electronic device and the wireless power transmitter.

Meanwhile, according to various embodiments of the disclosure, the wireless power transmitter may determine whether there is an obstacle by checking a TOF of each communication signal. According to various embodiments of the disclosure, the communication signal may include a time stamp of a transmission time point. Accordingly, the first communication signal may include a timestamp of a time point at which the first communication signal is transmitted, and the second communication signal may include a timestamp of a time point at which the second communication signal is transmitted. The wireless power transmitter may determine a first TOF of the first communication signal by comparing a reception time point and a transmission time point of the first communication signal, and determine a second TOF of the second communication signal by comparing a reception time point and a transmission time point of the second communication signal. As described with reference to FIGS. 15A and 15B, if there is no obstacle, the first TOF and the second TOF may be actually the same.

Accordingly, the wireless power transmitter may determine whether there is an obstacle on the basis of the difference between the first TOF and the second TOF.

Figure 17:
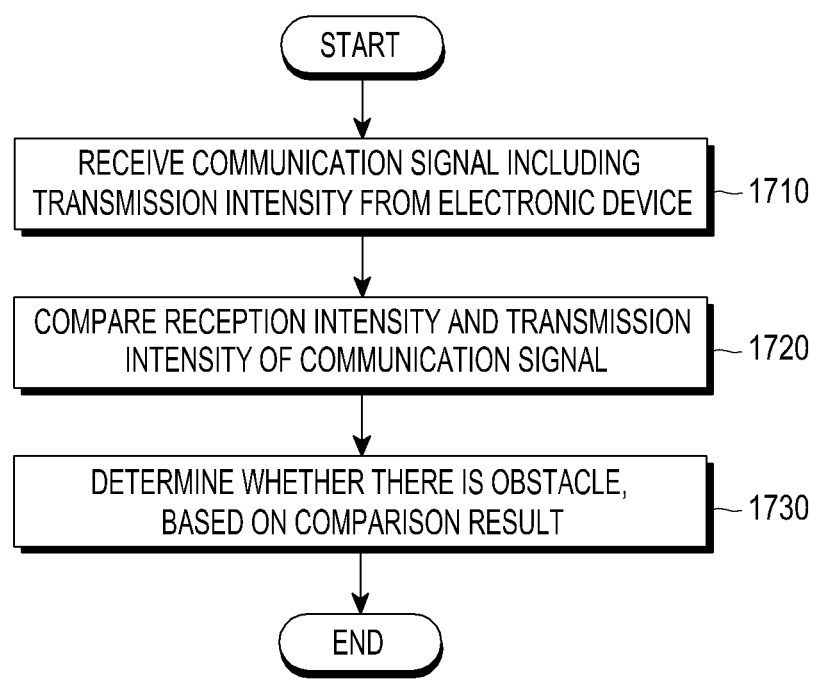
FIG. 17 is a flowchart illustrating a method of controlling the wireless power transmitter according to various embodiments of the disclosure.

FIG. 17 is a flowchart illustrating a method of controlling a wireless power transmitter according to various embodiments of the disclosure.

In operation 1710, the wireless power transmitter may receive a communication signal including a transmission intensity from the electronic device. In operation 1720, the wireless power transmitter may receive a communication signal and compare a reception intensity and a transmission intensity of the communication signal. The wireless power transmitter may measure the reception intensity of the communication signal and compare the reception intensity with the transmission intensity included in the communication signal so as to determine an attenuation degree.

In operation 1730, the wireless power transmitter may determine whether there is an obstacle on the basis of the comparison result. If there is an obstacle, a communication signal may be absorbed in the obstacle or may be transferred to the wireless power transmitter while avoiding obstacle through a detour path, and accordingly, the attenuation degree may increase. Accordingly, when it is determined that the attenuation degree is larger than a threshold value, the wireless power transmitter may determine that there is an obstacle. As described above, the wireless power transmitter may determine a reception direction of the communication signal, and accordingly, determine a direction in which the obstacle is located.

According to various embodiments of the disclosure, a storage medium storing instructions is provided. The instructions may be configured to cause at least one processor to, when executed by the at least one processor, perform at least one operation. The at least one operation may include an operation of determining a direction in which an electronic device is located, an operation of, when the direction in which the electronic device is located is not included in coverage corresponding to a steering direction of a power transmission antenna array, mechanically adjusting the steering direction of the power transmission antenna array, and an operation of controlling the power transmission antenna array to transmit power to the electronic device.

The instructions as described above may be stored in an external server, or may be downloaded by and installed in an electronic device, such as a wireless power transmitter. That is, the external server according to various embodiments of the disclosure may store instructions which can be downloaded by the wireless power transmitter.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

What is claimed is:

1. A wireless power transmitter comprising:
   a power transmission antenna array configured to generate power waves that constructively interfere with one another to form a pocket of energy;
   a driving circuit configured to mechanically adjust a direction of the power transmission antenna array; and
   a processor configured to:
      identify a location of an electronic device;
      control the driving circuit to mechanically adjust the direction of the power transmission antenna array to a second direction if the identified location of the electronic device is not included in a first coverage corresponding to a first direction of the power transmission antenna array, wherein a second coverage corresponds to the second direction of the power transmission antenna array; and
   based on the identified location of the electronic device being included in the first coverage;
      control the power transmission antenna array to form a first detection radio frequency (RF) wave corresponding to a first distance;
      receive, from the electronic device, first information associated with a received power in response to the first detection RF wave;
      in response to the received power being less than a threshold, control the power transmission antenna array to form a second detection RF wave corresponding to a second distance; and
      in response to the received power being greater than or equal to the threshold, control the power transmission antenna array to form the power waves corresponding to the first distance to provide wireless power to the electronic device.

2. The wireless power transmitter of claim 1, wherein the first coverage and the second coverage are set such that, when the identified location of the electronic device is included in a respective one of the first coverage or the second coverage, the electronic device receives power larger than or equal to a preset magnitude.

3. The wireless power transmitter of claim 1, wherein the first coverage is set to range from a preset first angle to a preset second angle with respect to a central line passing through a center of the power transmission antenna array.

4. The wireless power transmitter of claim 1, wherein the processor is further configured to, based on identifying that the location of the electronic device is not included in the first coverage corresponding to the first direction of the power transmission antenna array, control the driving circuit to mechanically adjust the direction of the power transmission antenna array to a direction in which the electronic device is located.

5. The wireless power transmitter of claim 1, wherein the processor is further configured to, based on identifying that the location of the electronic device is not included in the first coverage, control the driving circuit to mechanically adjust the direction of the power transmission antenna array to the second direction such that the identified location of the electronic device is included in the second coverage.

6. The wireless power transmitter of claim 1, wherein the processor is further configured to detect an obstacle located between the electronic device and the wireless power transmitter.

7. The wireless power transmitter of claim 6, further comprising a communication circuit configured to receive a communication signal including information on a transmission intensity from the electronic device,
   wherein the processor is further configured to:
      measure a reception intensity of the communication signal;
      compare the reception intensity of the communication signal with the information on the transmission intensity; and
      identify the obstacle, based on a result of the comparison.

8. A wireless power transmitter, comprising:
   a power transmission antenna array configured to wirelessly transmit power;
   a communication circuit;

a driving circuit configured to mechanically adjust a direction of the power transmission antenna array; and a processor, wherein the processor is configured to:
identify a direction in which an electronic device is located;

control the driving circuit to mechanically adjust the direction of the power transmission antenna array based on identifying that the direction in which the electronic device is located is not included in coverage corresponding to the direction of the power transmission antenna array; and control the power transmission antenna array to transmit the power to the electronic device, wherein the processor is further configured to detect an obstacle between the electronic device and the wireless power transmitter based on identifying that a difference between a first time point at which a first communication signal transmitted from the electronic device is received by the communication circuit and a second time point at which a second communication signal transmitted from the electronic device is received by the communication circuit is larger than a preset threshold value.

9. The wireless power transmitter of claim 8, wherein the processor is further configured to control the driving circuit to mechanically adjust the direction of the power transmission antenna array such that the direction of the power transmission antenna array faces a reflecting plate for reflecting the power to deliver the power to the electronic device.

10. The wireless power transmitter of claim 9, wherein the processor is further configured to control the communication circuit to transmit a communication signal including at least one of information on the direction of the electronic device and information indicating a change in a direction of the reflecting plate to a communication circuit of the reflecting device.

11. The wireless power transmitter of claim 9, wherein the processor is further configured to:
identify at least one of a plurality of reflecting plates based on a direction of the obstacle; and control the driving circuit to mechanically adjust the direction of the power transmission antenna array such that the power transmission antenna array faces the identified reflecting plate.

12. A method of controlling a wireless power transmitter, the method comprising:
identifying a location of an electronic device;

mechanically adjusting a direction of a power transmission antenna array to a second direction if the identified location of the electronic device is not included in a first coverage corresponding to a first direction of the power transmission antenna array, wherein a second coverage corresponds to the second direction of the power transmission array; and based on the identified location of the electronic device being included in the first coverage;
controlling the power transmission antenna array to form a first detection radio frequency (RF) wave corresponding to the first distance;

receiving, from the electronic device, first information associated with a received power in response to the first detection RF wave;

in response to the received power being less than a threshold, controlling the power transmission antenna array to form a second detection RF wave corresponding to a second distance; and in response to the received power being greater than or equal to the threshold, controlling the power transmission antenna array to form power waves corresponding to the first distance to provide wireless power to the electronic device.

13. The method of claim 12, wherein the first coverage and the second coverage are set such that, when the identified location of the electronic device is included in a respective one of the first coverage or the second coverage, the electronic device receives power larger than or equal to a preset magnitude.

14. The method of claim 12, wherein the first coverage is set to range from a preset first angle to a preset second angle, with respect to a central line passing through a center of the power transmission antenna array.

15. The method of claim 12, wherein the mechanical adjusting of the direction of the power transmission antenna array comprises, based on identifying that the location of the electronic device is not included in the first coverage corresponding to the first direction of the power transmission antenna array, mechanically adjusting the direction of the power transmission antenna array to a direction in which the electronic device is located.

16. The method of claim 12, further comprising, based on identifying that the location of the electronic device is not included in the first coverage, mechanically adjusting the direction of the power transmission antenna array to the second direction such that the identified location of the electronic device is included in the second coverage.

17. The method of claim 12, further comprising detecting an obstacle located between the electronic device and the wireless power transmitter.

18. The method of claim 12, further comprising:
receiving a communication signal including information on a transmission intensity from the electronic device;

measuring a reception intensity of the communication signal;

comparing the reception intensity of the communication signal with the information on the transmission intensity; and identifying the obstacle, based on a result of the comparison.

19. A method of controlling a wireless power transmitter, the method comprising:
identifying a direction in which an electronic device is located;

mechanically adjusting a direction of a power transmission antenna array based on identifying that the direction in which the electronic device is located is not included in coverage corresponding to the direction of the power transmission antenna array;

receiving a first communication signal and a second communication signal transmitted from the electronic device;

identifying an obstacle based on identifying that a difference between a first time point at which the first communication signal is received and a second time point at which the second communication signal is received is larger than a preset threshold value; and controlling the power transmission antenna array to transmit the power to the electronic device.

20. The method of claim 19, further comprising mechanically adjusting the direction of the power transmission antenna array such that the direction of the power transmission antenna array faces a reflecting plate for reflecting the power to deliver the power to the electronic device.

\* \* \* \* \*